US012736015B2

(12) United States Patent
Crain et al.

(10) Patent No.: US 12,736,015 B2
(45) Date of Patent: Sep. 15, 2026

(54) SYSTEMS AND METHODS FOR ENGINE START

(71) Applicant: Polaris Industries Inc., Medina, MN (US)

(72) Inventors: Stephen G. Crain, Wyoming, MN (US); Trevor F. Rhodes, Badger, MN (US); Yassin M. Kelay, Sugiez (CH); David Buehler, Seedorf (CH); Markus Hoffet, Kappelen (CH); James H. Buchwitz, Strathcona, MN (US); Nicholas A.M. Hartung, Medina, MN (US); Ricky G. Jaeger, Osceola, WI (US); Ronnie R. Danielson, Roseau, MN (US); Dallas J. Blake, Roseau, MN (US); Beat R. Kohler, Kirchberg (CH); Philippe Gasdia, Rothrist (CH); Joseph D. Tharaldson, Taylors Falls, MN (US); Garrett J. Hebbard, Chisago City, MN (US); Andreas H. Bilek, Chisago City, MN (US); Derek Zimney, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 19/304,149

(22) Filed: Aug. 19, 2025

(65) Prior Publication Data

US 2026/0132753 A1 May 14, 2026

Related U.S. Application Data

(62) Division of application No. 17/944,677, filed on Sep. 14, 2022, now Pat. No. 12,416,272.

(Continued)

(51) Int. Cl.
*F02D 41/06* (2006.01)
*B62J 33/00* (2006.01)
(Continued)

(52) U.S. Cl.
CPC ........... *F02D 41/065* (2013.01); *B62J 33/00* (2013.01); *B62J 50/22* (2020.02); *F02N 3/00* (2013.01);
(Continued)

(58) Field of Classification Search
CPC ........ F02D 27/00; F02D 27/02; F02D 41/065; F02D 2250/06; F02N 3/00; F02N 3/02;
(Continued)

(56) References Cited

U.S. PATENT DOCUMENTS 2,881,744 A * 4/1959 Quarles ................ F02P 15/001 123/41 R
3,176,525 A * 4/1965 Rose ...................... F02D 27/00 74/7 R (Continued)

FOREIGN PATENT DOCUMENTS

EP 3376018 A2 * 9/2018 .......... F02N 19/005

OTHER PUBLICATIONS

European Extended Search Report in Application 25220856.6 mailed Feb. 3, 2026, 6 pages.

*Primary Examiner* — John M Zaleskas
(74) *Attorney, Agent, or Firm* — Merchant & Gould, P.C.

(57) ABSTRACT

Systems and methods for starting and restarting an engine of a vehicle are disclosed. Power systems for an engine are disclosed.

6 Claims, 25 Drawing Sheets

Related U.S. Application Data

(60) Provisional application No. 63/244,897, filed on Sep. 16, 2021.

(51) Int. Cl.
*B62J 50/22* (2020.01)
*F02N 3/00* (2006.01)
*F02N 3/02* (2006.01)
*F02N 11/04* (2006.01)
*F02N 11/08* (2006.01)
*F02P 9/00* (2006.01)
*H01M 10/42* (2006.01)
*H01M 10/44* (2006.01)
*H01M 10/615* (2014.01)
*H01M 10/625* (2014.01)

(52) U.S. Cl.
CPC ................ *F02N 3/02* (2013.01); *F02N 11/04* (2013.01); *F02N 11/0803* (2013.01); *F02N 11/0859* (2013.01); *F02N 11/0866* (2013.01); *F02P 9/002* (2013.01); *H01M 10/4264* (2013.01); *H01M 10/44* (2013.01); *H01M 10/615* (2015.04); *H01M 10/625* (2015.04); *F02D 2200/60* (2013.01); *F02N 2011/0888* (2013.01); *H01M 2220/20* (2013.01)

(58) Field of Classification Search
CPC .. F02N 11/04; F02N 11/0803; F02N 11/0859; F02N 11/0866; F02N 2011/0885; F02N 2011/0888; F02N 2011/0896; F02N 2200/022; F01L 13/02; F01L 2760/002; F01L 2760/006; F02P 5/1506; F02P 9/002
See application file for complete search history.

(56) References Cited

U.S. PATENT DOCUMENTS 3,981,278 A * 9/1976 Harada .................... F02P 11/02 123/41 E
5,036,802 A * 8/1991 D'Amours ............ F02P 5/1502 123/41 E
5,782,210 A * 7/1998 Venturoli .............. F02P 7/0675 123/41 E
5,794,574 A * 8/1998 Bostelmann ............ F02D 27/02 123/41 E
5,964,191 A * 10/1999 Hata ....................... F01L 13/02 123/41 E
6,039,010 A * 3/2000 Hata ....................... F01L 13/02 123/41 E
6,044,807 A * 4/2000 Hata ....................... F01L 13/02 123/41 E
6,098,574 A * 8/2000 Arakawa ................. F01L 13/02 123/41 E
6,234,119 B1 * 5/2001 Tsukada .................. F01L 13/02 123/41 E
6,357,398 B1 * 3/2002 Arakawa ................. F01L 13/02 123/41 E
6,405,687 B1 * 6/2002 Arakawa ................... F01L 1/34 123/41 E
6,474,273 B1 * 11/2002 Kinoshita ............... F02P 7/077 123/41 E
6,588,397 B1 * 7/2003 Sieber ................... F02N 99/006 123/179.5
7,380,538 B1 * 6/2008 Gagnon .............. B60W 30/146 477/97
12,416,272 B2 * 9/2025 Crain .................... F02D 41/065
2001/0001387 A1 * 5/2001 Gander ................... F02D 27/02 123/41 E
2003/0111024 A1 * 6/2003 Venturoli ................. F02P 11/02 123/41 E
2003/0177990 A1 * 9/2003 Tsukada .............. F01L 13/0005 123/90.15
2005/0178347 A1 * 8/2005 Beil ........................ F02B 77/08 123/41 E
2008/0035109 A1 * 2/2008 Iwaki .................... F02P 5/1502 123/41 E
2009/0061705 A1 * 3/2009 Wiatrowski ........ F02N 11/0862 440/85
2011/0148354 A1 * 6/2011 Wenger ................... F16F 1/376 320/109
2011/0155085 A1 * 6/2011 Hirano ................ F02N 11/0844 123/179.3
2015/0377162 A1 * 12/2015 Kamioka .............. F02N 19/005 701/112
2018/0347534 A1 * 12/2018 Lebreux .............. F02N 11/0803
2019/0152466 A1 * 5/2019 Suzuki ................... B60K 6/485
2019/0153988 A1 * 5/2019 Lebreux .................. F02N 11/06
2019/0153989 A1 * 5/2019 Lebreux .................. F02N 11/06
2019/0153990 A1 * 5/2019 Lebreux .................. F02N 11/06
2019/0195158 A1 * 6/2019 Dudar ................. F02D 41/0007
2020/0056559 A1 * 2/2020 Lebreux .............. F02N 11/0866
2020/0080503 A1 * 3/2020 Lebreux .................. F02N 11/04
2020/0080504 A1 * 3/2020 Lebreux .................. F02N 11/06
2020/0080505 A1 * 3/2020 Lebreux .................. F02B 33/04
2020/0408291 A1 * 12/2020 Pard ....................... F16H 37/021
2021/0062774 A1 * 3/2021 Lebreux .............. F02N 11/0866
2021/0237603 A1 * 8/2021 Wang ........................ B60K 6/20
2021/0242705 A1 * 8/2021 Wang .................... B60L 15/007
2022/0364520 A1 * 11/2022 Lebreux .................. F02B 33/04
2023/0102266 A1 * 3/2023 Crain ..................... F02D 41/065 701/113
2024/0084752 A1 * 3/2024 Bernier ................. F02D 41/062
2024/0301850 A1 * 9/2024 Bernier ................... F02N 11/08

* cited by examiner

SYSTEMS AND METHODS FOR ENGINE START

CROSS-REFERENCE TO RELATED APPLICATION

This application a divisional application of U.S. application Ser. No. 17/944,677, filed on Sep. 14, 2022, which claims the benefit of and priority to U.S. Application No. 63/244,897, filed on Sep. 16, 2021, the disclosure of which is hereby incorporated by reference in its entirety

TECHNICAL FIELD

The present disclosure relates generally to an engine starting system and, more particularly, to an engine starting system having an electric start control.

BACKGROUND

Generally, to start or restart an engine of a recreational vehicles, such as snowmobiles, a user of a vehicle may pull on a rope of a recoil starter to cause a crankshaft of the engine to turn. The pull needs to be fast enough to turn the crankshaft to reach a threshold speed to manually start the engine. However, the manual start of the engine by pulling the rope at the start or every restart of the engine during the ride may cause fatigue in the user.

SUMMARY

As set forth above, embodiments provided herein relate to engine starting system of a recreational vehicle. Exemplary embodiments include but are not limited to the following examples.

In one aspect, a method for controlling different starting modes of an internal combustion engine of a vehicle is provided. The method includes determining whether a power level of a power source is above a first predetermined threshold, determining, in response to determining that the power level is above the first predetermined threshold, that a full-starting mode is available, determining, in response to determining that the power level is not above the first predetermined threshold, whether the power level is below a second predetermined threshold, determining, in response to determining that the power level is below the second predetermined threshold, that a manual starting mode is available, determining, in response to determining that the power level is not below the second predetermined threshold, that a pull-assist starting mode is available, and transmitting a notification to a user indicating an available starting mode.

In some embodiments, the method may further include receiving a user request to start an engine prior to determining the power level, wherein the user request is received via a user input sensor of the vehicle.

In some embodiments, the method may further include receiving a user request to start an engine subsequent to determining the power level, wherein the user request is received via a user input sensor of the vehicle.

In some embodiments, the user input sensor may include a button, a pull recoil handle sensor, a pull force sensor, and/or a recoil rotation sensor.

In some embodiments, the full-starting mode may support electric start or restart of the engine by using the power source to deliver electrical power to an engine control module (ECM).

In some embodiments, the manual starting mode may support manual pull start via a rope of a recoil starter.

In some embodiments, the pull-assist starting mode may support electric start with manual pull assist.

In some embodiments, in the pull-assist starting mode, when a rope of a recoil starter is pulled by the user, current may be driven into a stator to apply cranking assist torque to a crankshaft to turn the engine.

In some embodiments, the notification may be displayed on a display screen of the vehicle.

In some embodiments, the notification may be a text notification and/or a light indicator with a blinking pattern and/or color that corresponds to a different starting mode.

In another aspect, a hybrid battery system for starting and restarting an engine of a vehicle is provided. The hybrid battery system includes a DC/DC converter, a supercapacitor system configured to provide electric power to the engine during engine starting at low temperature and be recharged when the engine is running, and a lithium-ion battery removably connected to the vehicle and configured to precharge the supercapacitor system when the engine is not running.

In other aspect, a method for restarting an engine in a reverse direction is provided. The method includes receiving, by an engine control unit, a user request to reverse engine rotation while engine is running, determining, by the engine control unit, whether one or more parameters satisfy predefined condition to perform reverse engine rotation, performing, in response to determining that the one or more parameters satisfy reverse engine rotation requirements and by the engine control unit, an engine reverse process by switching a starter-generator controller to a starter mode, applying, by the starter-generator controller, braking torque to a crankshaft of the vehicle by sending excess power to a power source to decelerate a speed of the crankshaft, developing, by the starter-generator controller, torque in an opposite direction of a current rotation of the crankshaft by using energy from the power source, and switching, in response to determining that the crankshaft is rotating in the opposite direction, by the engine control unit, the starter-generator controller back to a voltage regulator mode and recharge the power source.

In some embodiments, receiving the user request to reverse engine rotation while engine is running may include receiving the user request via a user input of the vehicle, wherein the user input includes a pushbutton of the vehicle or a selection on a touchscreen display that is communicatively coupled to the vehicle.

In some embodiments, performing the engine reverse process by switching a starter-generator controller to a starter mode may include disabling, by the engine control unit, spark and fuel to the engine, transmitting, by the engine control unit, a signal to the starter-generator controller to switch the starter-generator controller to the starter mode.

In some embodiments, the method may further include determining, by the starter-generator controller, if the power source are fully charged, and shunting, in response to determining that the power source are fully charged and by the starter-generator controller, a stator to provide the braking torque to the crankshaft.

In some embodiments, developing torque in the opposite direction of the current rotation of the crankshaft may include determining if a speed of the crankshaft is below a predefined threshold, and developing, in response determining that the speed of the crankshaft is below a predefined threshold, torque in the opposite direction of the current rotation of the crankshaft by using energy from the power source.

In some embodiments, switching the starter-generator controller back to the voltage regulator mode may include enabling, by the engine control unit, the spark and fuel to restart the engine.

In another aspect, an electric reverse control system for restarting an engine in a reverse direction is provided. The electric reverse control system includes a power source, a reverse control user input configured to receive a user request to reverse engine rotation, an engine control module (ECM), and a starter-generator controller having a starter mode and a voltage regulator mode. The ECM is configured to receive the user request to reverse engine rotation while engine is running, determine whether one or more parameters satisfy predefined condition to perform reverse engine rotation, perform, in response to determination that the one or more parameters satisfy reverse engine rotation requirements, an engine reverse process by switching a starter-generator controller to a starter mode, control operations of the starter-generator controller. The starter-generator controller is configured to apply braking torque to a crankshaft of the vehicle by sending excess power to the power source to decelerate a speed of the crankshaft, and develop torque in an opposite direction of a current rotation of the crankshaft by using energy from the power source.

In some embodiments, the user input may include a pushbutton of the vehicle or a selection on a touchscreen display that is communicatively coupled to the vehicle.

In some embodiments, to perform the engine reverse process by switching a starter-generator controller to a starter mode may include to disable spark and fuel to the engine, and transmit a signal to the starter-generator controller to switch the starter-generator controller to the starter mode.

In some embodiments, the starter-generator controller may be further configured to determine if the power source are fully charged, and shunt, in response to determination that the power source are fully charged, a stator to provide the braking torque to the crankshaft.

In some embodiments, to develop torque in the opposite direction of the current rotation of the crankshaft may include to determine if a speed of the crankshaft is below a predefined threshold, and develop, in response determination that the speed of the crankshaft is below a predefined threshold, torque in the opposite direction of the current rotation of the crankshaft by using energy from the power source.

In some embodiments, to switch the starter-generator controller back to the voltage regulator mode may include to enable the spark and fuel to restart the engine.

In other aspect, an engine starting system for starting and restarting an engine of a vehicle is provided. The engine starting system includes a DC/DC converter, an integrated starter generator (ISG) configured to recharge the lithium-ion capacitors when the engine is running, and lithium-ion capacitors configured to provide power to start and restart the engine.

In another aspect, a starter-generator system for providing electric start of an engine of a vehicle is provided. The starter-generator system includes an integrated starter-generator (ISG), a power source module including a power source and a bidirectional DC/DC voltage converter, wherein the power source is configured to supply power during engine starting and is recharged when the engine is running and the bidirectional DC/DC voltage converter is configured to provide charging of the power source, an energy storage configured to supply power when engine is running, and a starter-generator (ISG) controller configured to apply power to a stator for engine starting from the power source and to take power from the stator when running to supply an electrical load of vehicle from the energy storage.

In other aspect, a starter-generator system for providing electric start of an engine of a vehicle is provided. The starter-generator system includes a removeable power source removably coupled to the vehicle, a bidirectional DC/DC converter for charging the removeable power source from a vehicle power when the engine is running, supplying power to the vehicle prior to engine starting, and supplying power to in-vehicle infotainment and vehicle functions when an ignition key is off, and an integrated starter generator (ISG) operatively coupled to the removeable power source to provide a higher voltage to increase a starting torque.

In some embodiments, the removeable power source may include a port for off-board charging and/or heating the removeable power source; and a button and a plurality of LED lights. The button may be used to cause the removeable power source to display the state-of-charge by turning on one or more of the plurality of LED lights for a period of time, turn on or off a white LED to use as a flashlight, and/or turn on or off a self-heating mode to function as a hand warmer and/or preheat the removeable power source prior to be coupled to the vehicle.

In another aspect, a method for supplying power for vehicle starting from a removeable power source is provided. The method includes receiving a first user input while the removable power source is in an off state, transitioning, in response to receiving the first user input, the removable power source to a wake state, determining if a power capacity exceeds a predetermined threshold for electric start, transmitting, in response to determining that the power capacity exceeds the predetermined threshold for electric start, a notification to a user indicating that the electric start is possible, receiving a second user input requesting to electric start an engine, and supplying, in response to receiving the second user input, electrical power from the removable power source to an engine control module to produce starting torque.

In some embodiments, transitioning the removable power source to the wake state may include providing power from the removable power source to display on an engine control module.

In some embodiments, receiving the first user input may include monitoring a key switch or a power button input while the removable power source is in an off state to determine whether the first user input has been received.

In some embodiments, the method may further include transmitting, in response to determining that the power capacity does not exceed the predetermined threshold for electric start, a notification to a user indicating that the electric start is not possible.

In some embodiments, receiving the second user input may include receiving the second user input via a user input sensor of the vehicle, wherein the user input sensor may include a button, a pull recoil handle sensor, a pull force sensor, and/or a recoil rotation sensor.

In some embodiments, determining if the power capacity exceeds the predetermined threshold for electric start may include receiving, from the removeable power source, a maximum discharge current of the removeable power source based on a power source temperature and state-of-charge of the removeable power source, receiving, from the engine control module, an engine coolant temperature, determining the predetermined threshold based on the engine coolant temperature and time since the engine was stopped, and comparing the maximum discharge current against the predetermined threshold for the electric start.

In another aspect, a method for supplying power for vehicle starting from a removeable power source is provided. The method includes determining if a vehicle is turned on and engine is not running, determining if a power capacity exceeds a predetermined threshold for electric start, transmitting, in response to determining that the power capacity exceeds the predetermined threshold for electric start, a notification to a user indicating that the electric start is possible, receiving a user input requesting to electric start an engine in reverse, and operating, in response to receiving the user input, electrical power to an integrated starter-generator to turn engine in reverse direction.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Figure 1:
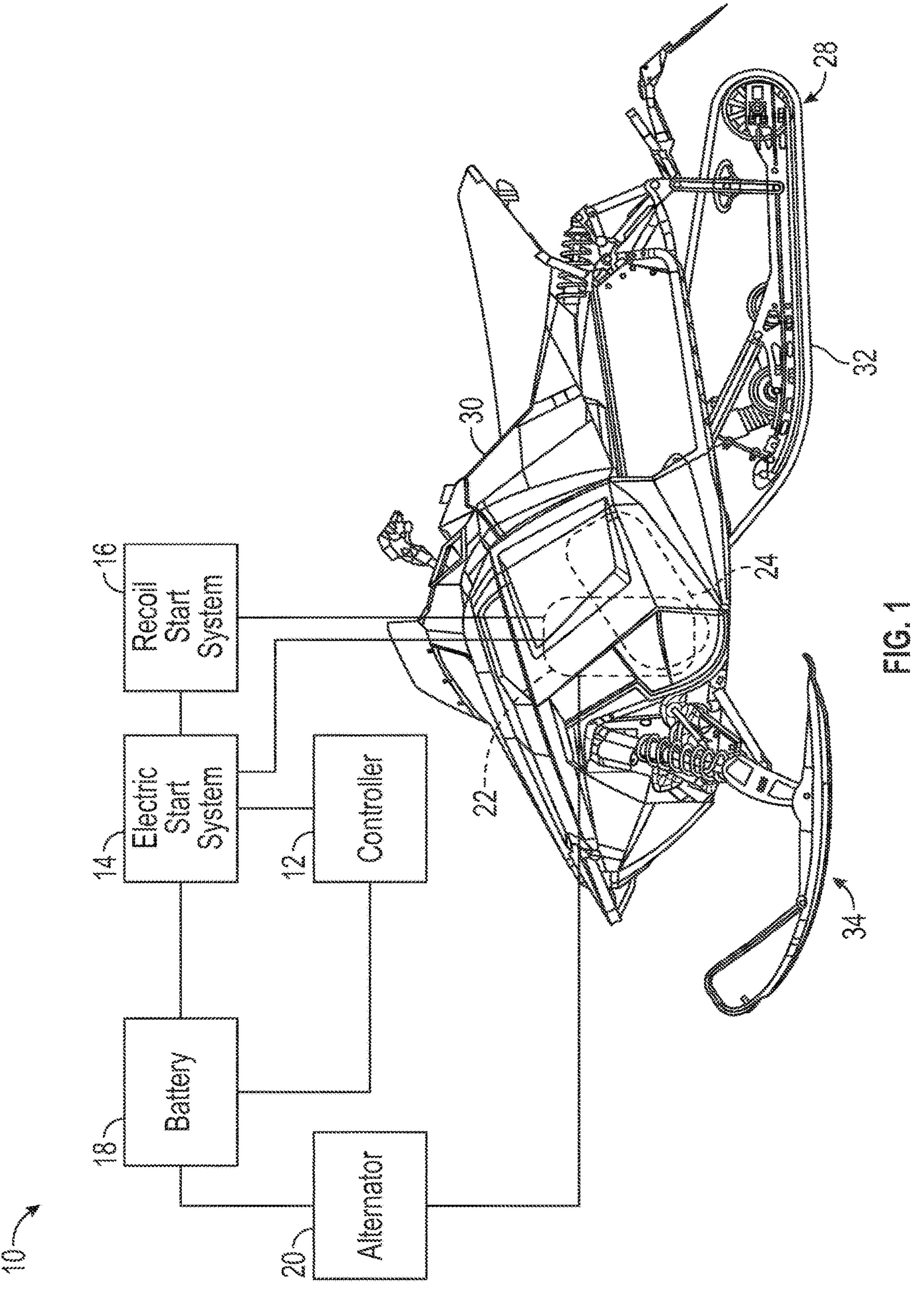
FIG. 1 illustrates a side view of an exemplary vehicle.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE DRAWINGS

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIG. 1, an exemplary embodiment of a vehicle 10 is shown. The illustrated vehicle 10 is a snowmobile. However, the following disclosure is applicable to other types of vehicles, such as all-terrain vehicles, motorcycles, watercraft, utility vehicles, and golf carts. Vehicle 10 includes a controller 12, a motor 22, an electric start system 14, a recoil start system 16, an alternator 20, a fuel source 30 (e.g., gasoline), a power source 18 (e.g., battery), a continuously variable transmission (CVT) 24, and a variety of ground engaging members 28. Exemplary ground engaging members include skis, endless tracks, wheels, and other suitable devices which support vehicle 10 relative to the ground. For example, as illustrated in FIG. 1, ground engaging members 28 include a track assembly 32 (e.g., an endless track belt) and a pair of front skis 34. The track assembly 32 holds the rear of vehicle 10, while skis 34 support the front of vehicle 10. In addition, the track assembly 32 is operatively connected to a motor 22.

Figure 2:
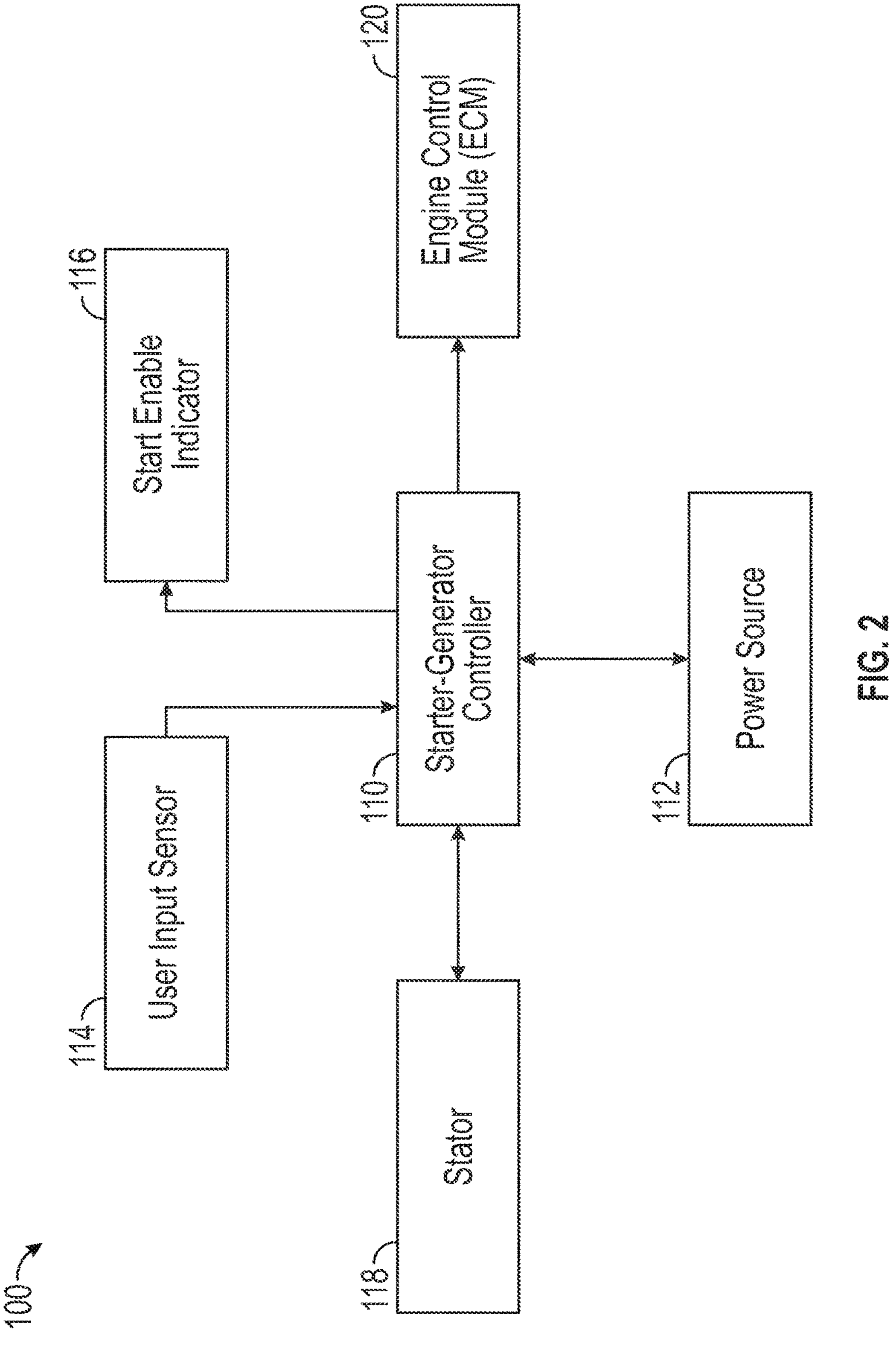
FIG. 2 illustrates a system for controlling different starting modes of an internal combustion engine including a starter-generator controller, according to an example of the present disclosure.

Referring to FIG. 2, a starter-generator system 100 for controlling different starting modes of an internal combustion engine is described. Generally, to start or restart the engine, a user of a vehicle may pull on a rope of a recoil starter to cause a crankshaft of the engine to turn. The pull needs to be fast enough to turn the crankshaft to reach a threshold speed to manually start the engine. However, the manual start of the engine by pulling the rope at the start or every restart of the engine during the ride may cause fatigue in the user.

In the illustrative embodiment, starter-generator system 100 determines an available starting mode of the engine based at least on power source health to reduce a number of manual starts performed by the user during the ride. To do so, the starter-generator system 100 includes a starter-generator controller 110, a power source 112, a user input sensor 114, a start enable indicator 116, a stator 118, and an engine control module (ECM) 120. ECM 120 is operatively connected to starter generator system 100 to receive power to control performance of the internal combustion engine.

Starter-generator controller 110 is configured to determine available starting mode of the vehicle based at least in part on the health or level of power source 112 (e.g., a battery level). The power source 112 may be embodied as multiple interconnected batteries or ultracapacitors. In the illustrative embodiment, the starting mode option includes a full starting mode, a pull-assist starting mode, and a manual starting mode. The full starting mode supports electric start or restart of the engine by using power source 112 to deliver electrical power to ECM 120 when power source 112 satisfies a first characteristic (e.g., above a first predetermined threshold). The manual starting mode supports manual pull start via the rope of a recoil starter when power source 112 satisfies a second characteristic (e.g., below a second predetermined threshold).

Additionally, the pull-assist starting mode supports electric start with manual pull assist when power source 112 does not satisfy the first and second characteristics (e.g., between the first and second predetermined thresholds), which is described further below. By providing the pull-assist starting mode, starter-generator system 100 may provide an alternative starting option that reduces a pull force required to start the engine when the full electric start is not available. It should be appreciated that by providing the pull-assist starting option, starter-generator controller 110 may provide an alterative starting option to reduce a pull force required to start the engine without impacting a weight of the vehicle while maintaining the rotational inertia of the engine. For example, in the pull-assist starting mode, when the rope of the recoil starter is pulled by the user, starter-generator controller 110 drives current into stator 118 to apply cranking assist torque to the crankshaft. This will reduce the pull effort required to start the engine.

Starter-generator controller 110 is further configured to provide the available starting mode option to the user via a start enable indicator 116. Exemplary indicators include audio indicators, visual indicators, tactile indicators, and combinations thereof. For example, the indication may be displayed on a display screen of the vehicle. The indication may be a text notification and/or a light indicator with a blinking pattern and/or color that corresponds to a different starting mode.

In some embodiments, starter-generator controller 110 may receive an indication from the user via user input sensor 114 indicating that the user wants to start the engine. The user input sensor 114 may include, but not limited to, a button, a pull recoil handle sensor, a pull force sensor, and/or a recoil rotation sensor. It should be appreciated that the indication of the user may be received prior to or subsequent to determining the available starting mode of the engine based on the power source level.

Figure 3:
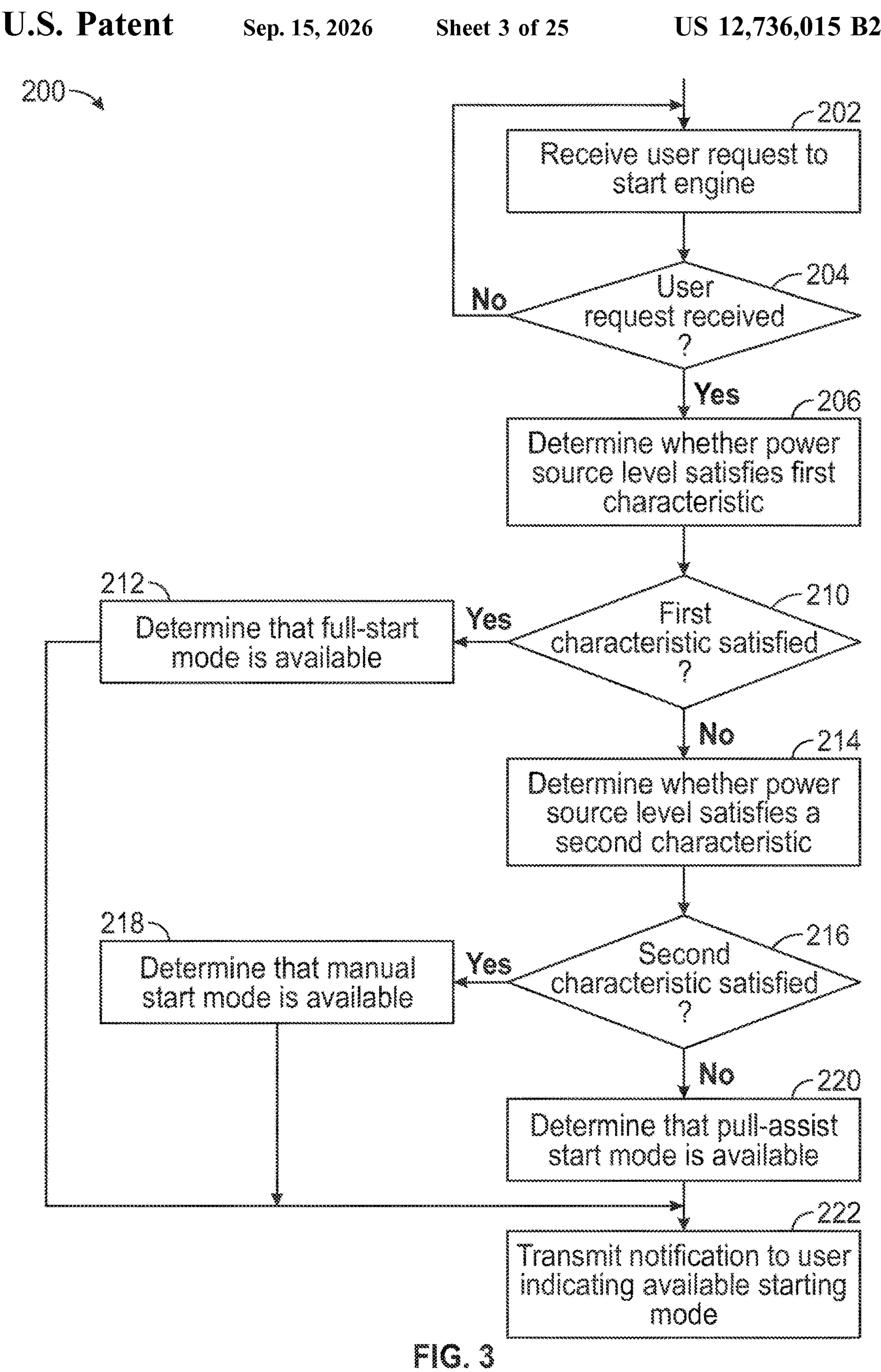
FIG. 3 is a flow diagram illustrating a computer-implemented method for controlling different starting modes of an internal combustion engine controlling different starting modes of an internal combustion engine using the starter-generator controller of FIG. 2.

Referring now to FIG. 3, a computer-implemented method 200 for controlling different starting modes of an internal combustion engine of a vehicle is shown. As described above, the starting modes of the internal combustion engine includes a full starting mode, a pull-assist starting mode, and a manual starting mode. In the illustrative embodiment, method 200 is performed by a starter-generator controller (e.g., 110) of a starter-generator system (e.g., 100) of the vehicle. In block 202, starter-generator controller 110 receives a user request to start the internal combustion engine. For example, the user request may be received via a user input sensor (e.g., 114) of the vehicle. User input sensor 114 may include, but not limited to, a button, a pull recoil handle sensor, a pull force sensor, and/or a recoil rotation sensor.

If starter-generator controller 110 determines that a user request has not been received in block 204, method 200 loops back to block 204 to continue awaiting a user request. If, however, starter-generator controller 110 determines that a user request was received in block 204, method 200 proceeds to block 206.

In block 206, starter-generator controller 110 determines whether a power source level satisfies a first characteristic. For example, the first characteristic may include the power source level being above a first predetermined threshold. It should be appreciated that the power source level (e.g., energy storage capability) may be determined based on various sensor inputs (e.g., battery state-of-charge and battery temperature). The power source level may be determined by the power source 112 or the starter-generator controller 110 based on the embodiment of the power source 112 (e.g., an energy storage device).

If starter-generator controller 110 determines that the power source level satisfies the first characteristic (e.g., above the first predetermined threshold) in block 210, method 200 proceeds to block 212. In block 212, starter-generator controller 110 determines that the starter-generator system 100 supports electric start or restart of the engine by using the power source 112 to deliver electrical power to the ECM 120. Subsequently, method 200 skips ahead to block 222 to transmit a notification to the user indicating that the full-starting mode is available to start or restart the vehicle.

Referring back to block 210, if starter-generator controller 110 determines that the power source level does not satisfy the first characteristic (e.g., below the first predetermined threshold), method 200 advances to block 214. In block 214, starter-generator controller 110 determines whether the power source level satisfies a second characteristic. For example, the second characteristic may include the power source level being above a second predetermined threshold. If starter-generator controller 110 determines that the power level satisfies the second characteristic in block 216 (e.g., between the first and second predetermined thresholds), method 200 proceeds to block 218. In block 218, starter-generator controller 110 determines that the power is depleted but the remaining power is enough to support the pull-assist starting mode. Subsequently, method 200 skips ahead to block 222 to transmit a notification to the user indicating that the manual starting mode is available to start or restart the vehicle.

Referring back to block 216, if starter-generator controller 110 determines that the power source level does not satisfy the second characteristic (e.g., below the second predetermined threshold), method 200 proceeds to block 220. In block 220, starter-generator controller 110 determines that the power source level is too low and that only the manual starting mode is supported by the starter-generator system 100. Subsequently, method 200 skips ahead to block 222 to transmit a notification to the user indicating that the pull-assist starting mode is available to start or restart the vehicle.

It should be appreciated that, in some embodiments, starter-generator controller 110 may determine the available starting mode of the engine prior to receiving a user request to start the engine. In other words, blocks 202 and 204 may be performed subsequent to blocks 206-220.

Figures 4, 5:
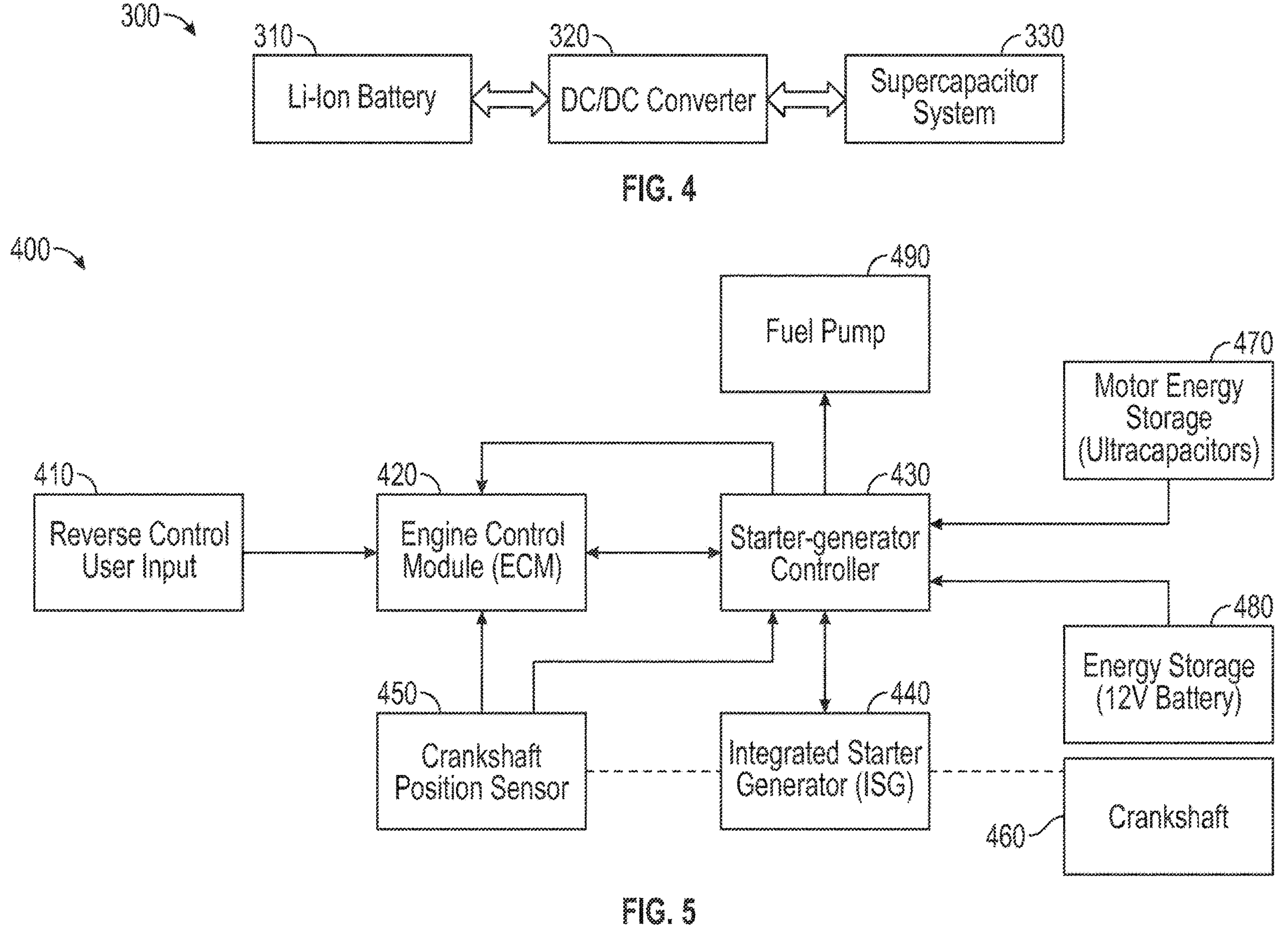
FIG. 4 illustrates a system for starting and restarting an engine of a vehicle including a lithium-ion (Li-Ion) battery, a DC/DC converter, and a supercapacitor system, according to an example of the present disclosure.
FIG. 5 illustrates a system for restarting an engine in a reverse direction, according to an example of the present disclosure.

Referring to FIG. 4, a hybrid battery system 300 for starting and restarting an engine of a vehicle is described. Hybrid battery system 300 is configured to provide a low self-discharge rate, a high performance at low temperature, a high energy density, and low weight and volume. To do so, hybrid battery system 300 includes a small lithium-ion (Li-Ion) battery 310, a DC/DC converter 320, and a supercapacitor system 330.

Li-ion battery 310 generally has a high energy density and a low self-discharge rate. This allows Li-ion battery 310 to provide electrical power to the engine during several engine starts. However, Li-ion battery 310 generally has a low performance at temperature below 0° C./32° F. Therefore, Li-ion battery 310 is not an efficient energy storage at lower temperature and, thus, is not a reliable energy source to start or restart the engine at lower temperature. Whereas, supercapacitor system 330 is capable of delivering high power even at very low temperatures (e.g., down to −40° C./−40° F.).

In the illustrative embodiment, DC/DC converter 320 and supercapacitor system 330 are part of the vehicle. Small Li-Ion battery 310 may be removably connected to the vehicle. Small Li-Ion battery 310 may be embodied as a 12-voltage energy storage, and DC/DC converter 320 may be embodied as a bidirectional buck-boost converter.

When the Li-Ion battery 310 is connected to the vehicle, it is configured to start pre-charging supercapacitor system 330 for an engine cold start. For example, the pre-charge time may be 10 to 20 seconds. However, it should be appreciated that the pre-charge time may depend on the design of the Li-Ion battery 310 and the DC/DC converter 320.

Once supercapacitor system 330 is charged, the engine can be started over an inverter and a starter-generator (e.g, alternating current generator (ACG)). Once the engine is running, the starter-generator may be used to recharge supercapacitor system 330 and Li-ion battery 310. It should be appreciated that, for an engine restart, a pre-charge cycle is not needed and can be done immediately.

Referring to FIG. 5, an electric reverse control system 400 for restarting an engine in a reverse direction is described. Specifically, upon receiving a reverse control event request from a rider, electric reverse control system 400 may decelerate a crankshaft of a vehicle and accelerate the crankshaft in the opposite direction to start the engine. To do so, electric reverse control system 400 includes a reverse control user input 410, an engine control module (ECM) 420, a starter-generator controller 430, an integrated starter generator (ISG) 440, a crankshaft position sensor 450, a crankshaft 260, a motor energy storage 470, an energy storage 480, and a fuel pump 490. It should be appreciated that the various controllers described herein may be combined to include the different control sequences described herein and interactions with other components.

Starter-generator controller 430 is operatively coupled to ECM 420 and ISG 440 to control the direction of the engine. ECM 420 is configured to receive a user request from a rider for restarting the engine in a reverse direction (e.g., reversing a direction of an engine rotation) via user input 410. User input 410 may be a pushbutton or selection on a touchscreen display. When the user request is received, ECM 420 is further configured to determine whether the vehicle is in a predefined condition to restart the engine in the reverse condition. If the user request cannot be completed, ECM 420 may transmit an error message notifying the rider that the vehicle cannot reverse the direction of the engine.

ECM 420 is further configured to disable spark and fuel supplied to the engine in response to a determination that all parameters of the vehicle meet the predefined condition to restart the engine in the reverse condition. Additionally, ECM 420 is configured to transmit a signal to starter-generator controller 430 to switch starter-generator controller 430 to a starter mode. For example, the signal may be sent via a controller area network (CAN), a discrete network, or any other suitable communication channel that may be formed between ECM 420 and starter-generator controller 430.

Starter-generator controller 430 is configured to switch between the starter mode and a voltage regulator mode to control ISG 440, which is configured to control crankshaft speed during the reverse control event. For example, in the starter mode, starter-generator controller 430 is configured to decelerate crankshaft 460 in response to receiving an engine reverse request signal from ECM 420. To do so, starter-generator controller 430 is configured to send excess power to ultracapacitors 470 to apply braking torque to crankshaft 460. If ultracapacitors 470 is fully charged, starter-generator controller 430 is configured to shunt a stator 118 of ISG 440 of the engine to provide the braking torque to decelerate crankshaft 460.

When the crankshaft speed drops below a predefined threshold, starter-generator controller 430 is configured to use energy from ultracapacitors 470 to develop torque in the opposite direction of the current crankshaft rotation. This torque will further decelerate crankshaft 460 and spin crankshaft 460 in the opposite direction. It should be appreciated that during the period where starter-generator controller 430 is using energy from ultracapacitors 470, alternative energy storage 480 (e.g., 12V battery) supplies power to ECM 420 and fuel pump 490. Once the engine is running in the opposite direction, starter-generator controller 430 is configured to switch back to the voltage regulator mode and recharge ultracapacitors 470.

Because electric reverse control system 400 allows ISG 440 to restart the engine in either direction, determining correct fuel amount and spark timing may not be necessary to change the engine direction. Accordingly, electric reverse control system 400 improves reliability and performance of a process of reversing the engine rotation.

Figure 6:
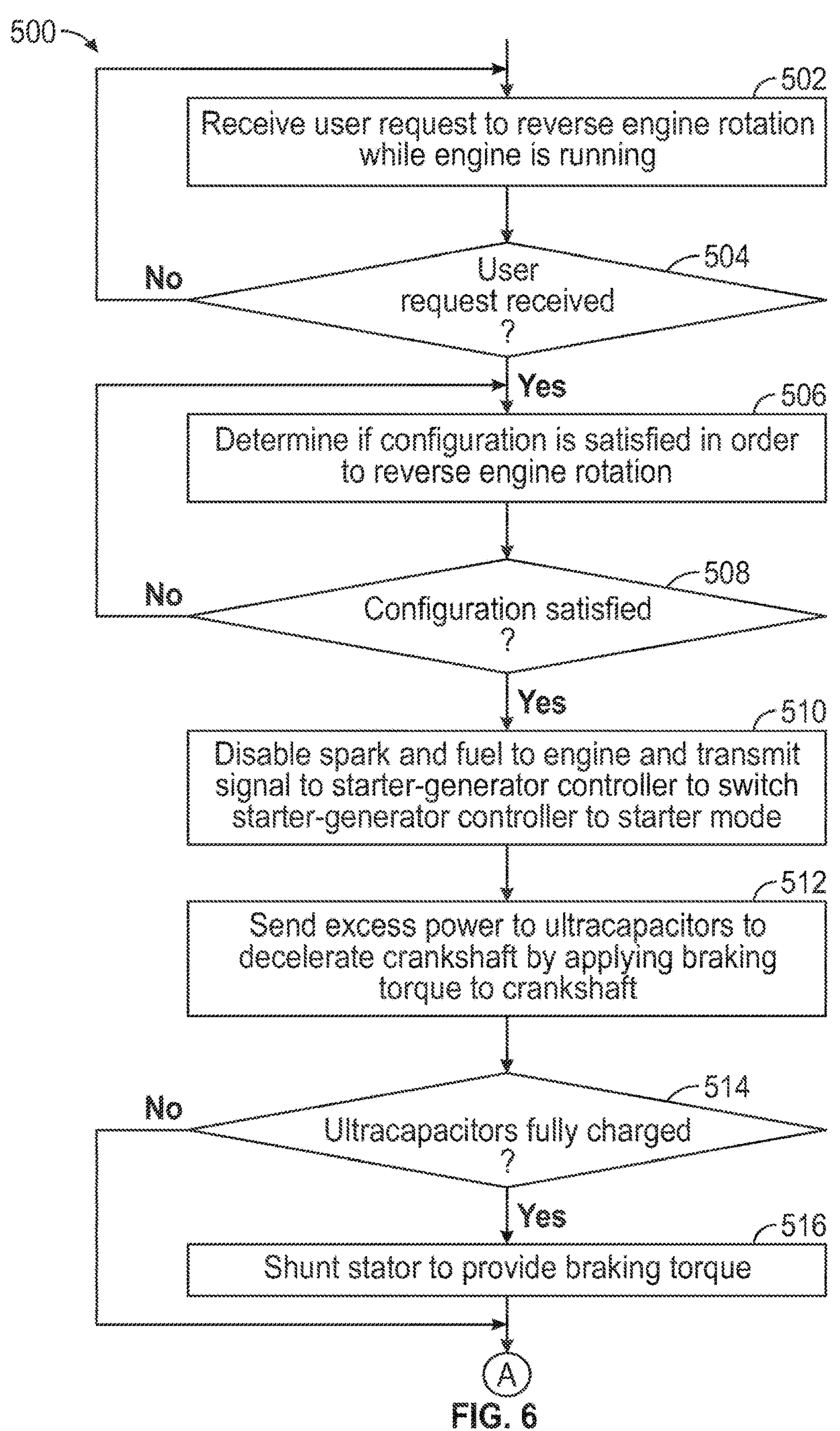
FIGS. 6 and 7 are a flow diagram illustrating a computer-implemented method for restarting an engine in a reverse direction by controlling a direction of an engine rotation of a vehicle.
Figure 7:
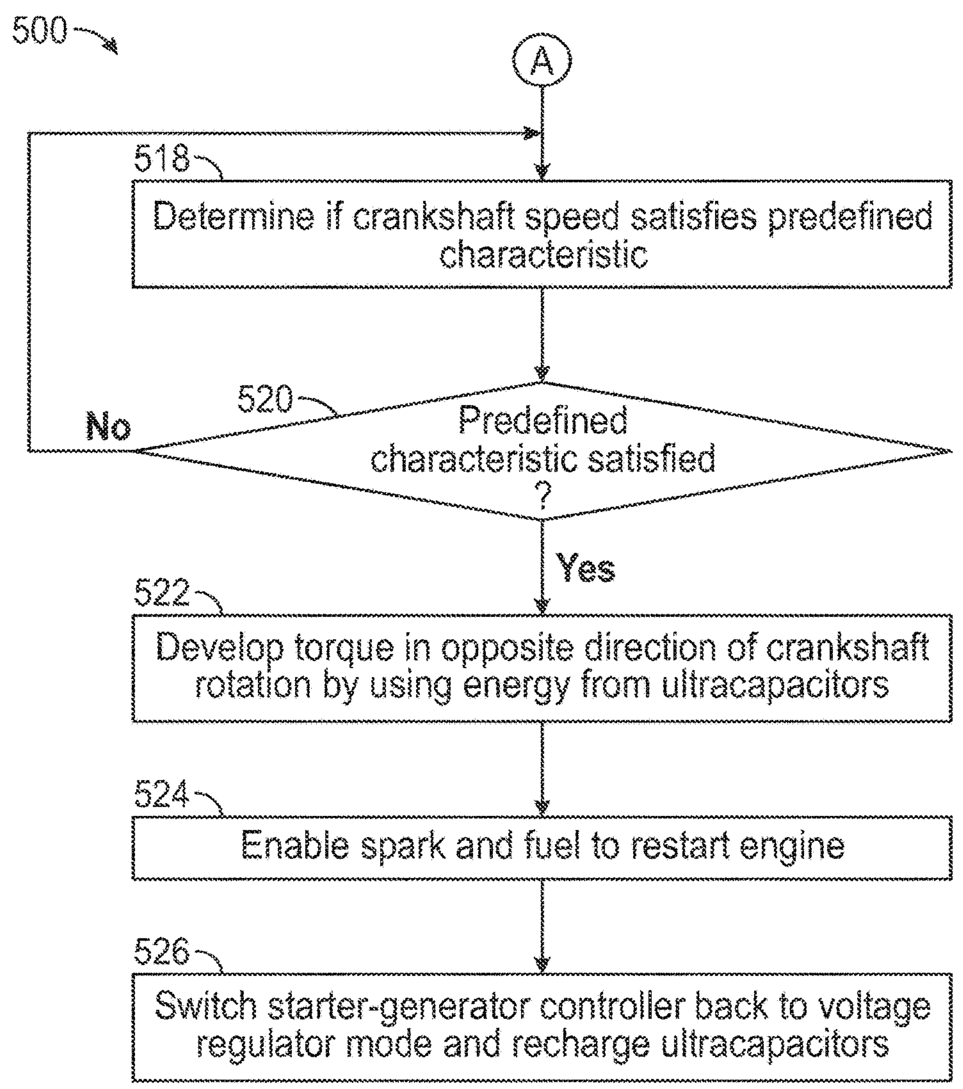

Referring now to FIGS. 6 and 7, a computer-implemented method 500 for restarting an engine in a reverse direction by controlling a direction of an engine rotation of a vehicle is shown. In the illustrative embodiment, method 500 is performed in part by an engine control module (ECM) (e.g., 420) and in part by a starter-generator controller (e.g., 430) of an electric reverse control system (e.g., 400) of the vehicle. In block 502, ECM 420 receives a user request from a rider for reversing a direction of an engine rotation while engine is running. For example, the user request may be received via a user input (e.g., 410) of the vehicle. User input 410 may be a pushbutton or selection on a touchscreen display. If a user request has not been received in block 504, method 500 loops back to block 502 to continue awaiting a user request for reversing the direction of the engine rotation. If, however, a user request has been received, method 500 proceeds to block 506.

In block 506, ECM 420 determines if a configuration is satisfied to be reversing the direction of the engine rotation. For example, ECM 420 determines if all parameters that are required to begin reversing the direction of the engine rotation are satisfied. For example, such parameters may include throttle position sensor reading being below a predetermined threshold and/or an engine speed (RPM) being below a predetermined threshold. If ECM 420 determines that the configuration is not satisfied in block 508, method 500 loops back to block 506 to continue awaiting the configuration to satisfy the predefined conditions. It should be appreciated that, in some embodiments, ECM 420 may notify the rider that the user request cannot be completed. If, however, ECM 420 determines that the configuration is satisfied in block 508, method 500 proceeds to block 510.

In block 510, ECM 420 begins an engine reverse process by disabling spark and fuel to the engine. ECM 420 transmits a signal to starter-generator controller 430 to switch starter-generator controller 430 to a starter mode. For example, the signal may be sent via a controller area network (CAN), a discrete network, or any other suitable communication channel that may be formed between ECM 420 and starter-generator controller 430.

In response, in block 512, starter-generator controller 430 begins to decelerate a crankshaft (e.g., 460) of the vehicle by sending excess power to ultracapacitors (e.g., 470). This will apply the braking torque to crankshaft 460. If starter-generator controller 430 determines that ultracapacitors 470 is fully charged in block 514, method 500 proceeds to block 516, in which starter-generator controller 430 shunts a stator of ISG 440 of the engine to provide the braking torque to decelerate crankshaft 460 in block 516. If, however, ultracapacitors 470 is not fully charged, starter-generator controller 430 continues to send excess power to ultracapacitors 470. Subsequently, method 500 proceeds to block 518 in FIG. 7 as shown by the alphanumeric character A in FIGS. 6 and 7.

In block 518, starter-generator controller 430 determines whether a crankshaft speed satisfies a predefined characteristic. For example, starter-generator controller 430 determines whether a crankshaft speed is below a predefined threshold. If the crankshaft speed does not satisfy the predefined characteristic (e.g., not below the predefined threshold), method 500 loops back to block 518 to continue determining the crankshaft speed until the crankshaft speed falls below the predefined threshold. If the crankshaft speed satisfies the predefined characteristic (e.g., below the predefined threshold), method 500 proceeds to block 522.

In block 522, starter-generator controller 430 uses energy from ultracapacitors 470 to develop torque in the opposite direction of the current crankshaft rotation. This torque will further decelerate crankshaft 460 and spin crankshaft 460 in the opposite direction. During the period where starter-generator controller 430 is using energy from ultracapacitors 470, alternative energy storage 480 (e.g., 12V battery) supplies power to ECM 420 and fuel pump 490.

When crankshaft 160 is spinning in the opposite direction, in block 524, ECM 420 enables spark and fuel to restart the engine. After the engine is running, starter-generator controller 430 switches back to a voltage regulator mode and recharges ultracapacitors 470, as indicated in block 526. In the illustrative embodiment, starter-generator controller 430 switches from the starter mode to the voltage regulator mode when certain characteristics (e.g., saturation of motor controller for a predetermined time period, and/or a number of crankshaft revolutions) are satisfied.

Figure 8:
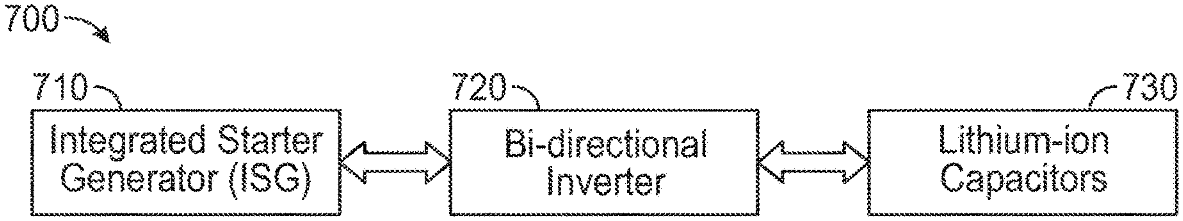
FIG. 8 illustrates a system for starting and restarting an engine of a vehicle, according to an example of the present disclosure.

Referring to FIG. 8, an engine starting system 700 starting and restarting an engine of a vehicle is described. Engine starting system 700 is configured to provide a high peak power, a high performance at low temperature, a high energy density, a low self-discharge rate, and low weight and volume. To do so, engine starting system 700 includes an integrated starter generator (ISG) 710, a bi-directional inverter 720, and lithium-ion capacitors 730.

Lithium-ion capacitors 730 is configured to provide power to start and restart an engine of a vehicle. Once the engine is running, integrated starter generator 710 may be used to recharge lithium-ion capacitors 730. When lithium-ion capacitors 730 is charged, the engine can be started over bi-directional inverter 720 and integrated starter generator 710.

Lithium-ion capacitors 730 may be rapidly charged and discharged, which provides a high peak power. Lithium-ion capacitors 730 has enough energy to provide power for several engine starts. Additionally, lithium-ion capacitors 730 has a low self-discharge rate and keeps the energy. In other words, lithium-ion capacitors 730 does not need to be pre-charged and may be used for an engine cold start.

Engine starting system 700 offers durability because lithium-ion capacitors 730 are not flammable and maintenance free, thereby providing a safe storage for engine starting system 700. By replacing a lead-acid battery with lithium-ion capacitors 730, the overall weight of the vehicle is significantly reduced compared to a starter system with lead-acid battery.

Figure 9:
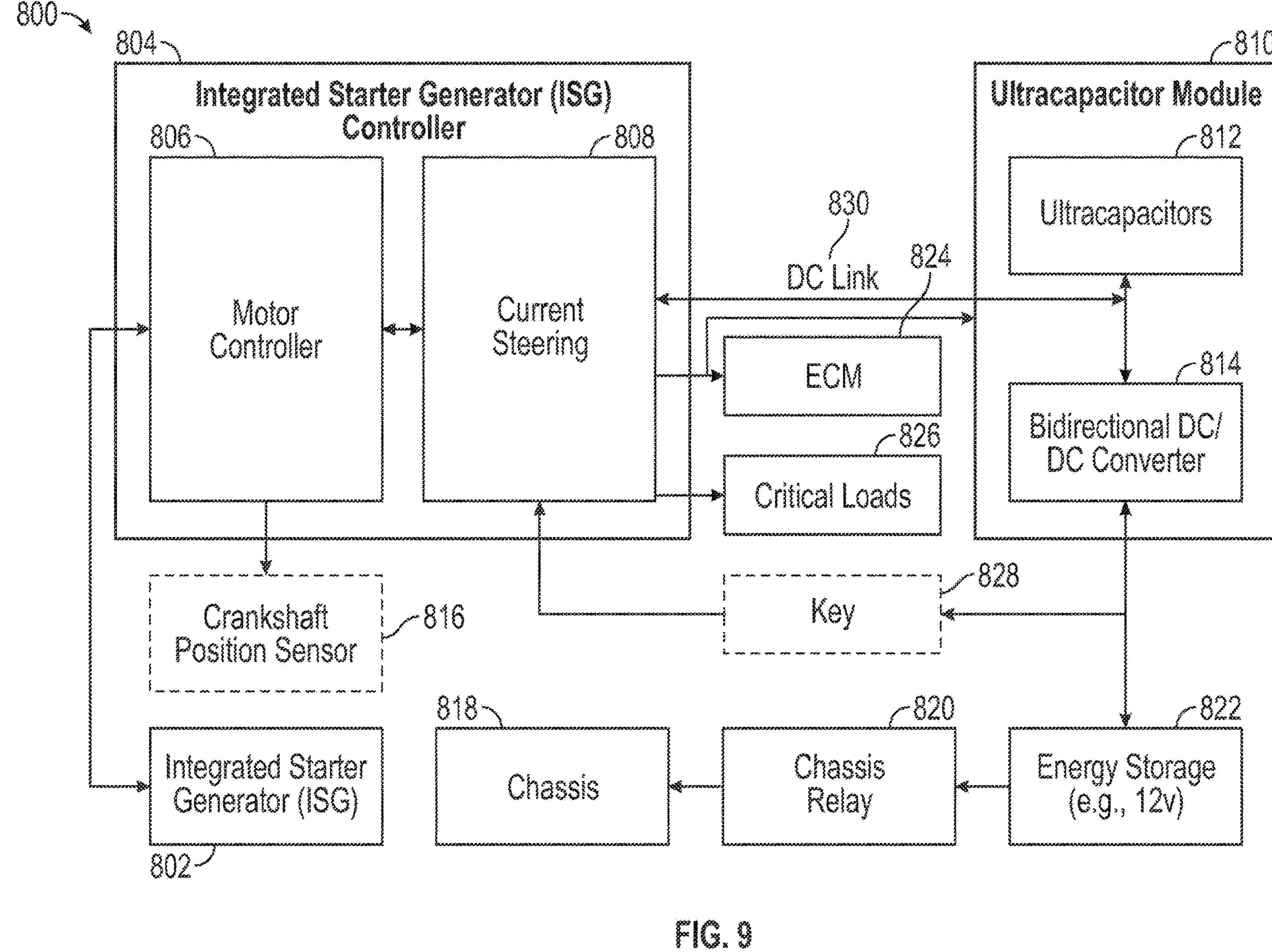
FIG. 9 illustrates a system for providing electric start, electrically assisted-starting, and power generation, according to an example of the present disclosure.

Referring to FIG. 9, a starter-generator system 800 for providing electric start, electrically assisted-starting, and power generation is described. Starter-generator system 800 includes a current steering integrated starter-generator (ISG) controller 804, an integrated starter-generator (ISG) 802, an ultracapacitor module (UCM) 810, and an energy storage 822. Ultracapacitor module 810 further includes ultracapacitors 812 and a bidirectional DC/DC voltage converter 814. In the illustrative embodiment, bidirectional DC/DC voltage converter 814 is combined with ultracapacitors 812 into a single ultracapacitor module 810. However, in some embodiments, bidirectional DC/DC voltage converter 814 may be combined with ISG controller 804 or as a standalone module.

Ultracapacitors 812 are configured to store energy and supply high power during engine starting. Whereas, energy storage 822 of the vehicle is configured to store electrical energy when the vehicle is not in use (e.g., engine stopped). For example, energy storage 822 may be embodied as a lightweight removable battery (e.g., 12V battery). Additional details of features of removable battery may be disclosed in U.S. Pat. No. 10,731,620, issued Aug. 4, 2020, and entitled "BATTERY KEY, STARTER AND IMPROVED CRANK", the complete disclosure of which is expressly incorporated by reference herein. It should be appreciated that, in some embodiments, starter-generator system 800 may not include a 12V energy storage. In such embodiments, the engine may be started manually if there is insufficient charge stored in ultracapacitors 812.

Integrated starter generator (ISG) 802 mechanically coupled to an engine crankshaft and is configured to drive current into a stator of ISG 802 to apply cranking torque to the crankshaft to start the engine. In some embodiments, starter-generator system 800 may include a crankshaft position sensor (CPS) 816 to measure a flywheel electrical angle.

ISG controller 804 is configured to operate as a motor controller 806 during engine starting and as a current steering 808 afterwards. In the illustrative embodiment, current steering 808 is embodied as a voltage regulator with current-steering functionality. Current steering 808 is configured to direct rectified ISG current to one of three outputs at a time in order to maintain all three at their target levels. For example, the three outputs may include the 16V ECM power output, 14V critical output, and 29V DC link output. In other words, ISG controller 804 is configured to apply power to the stator for starting and to take power from the stator when running to supply the vehicle's electrical loads.

Bidirectional DC/DC voltage converter 814 is configured to provide efficient charging of ultracapacitors 812 from zero voltage to a voltage greater than a voltage of battery 822. To do so, bidirectional DC/DC voltage converter 814 is configured to charge ultracapacitors 812 prior to engine starting, supply power directly from energy storage 822 (e.g., 12V battery) to the ISG controller 804 during the engine starting, and recharge an energy storage 822 and supply vehicle electrical loads once the engine has started. By charging ultracapacitors 812 in this manner, the peak current required from the vehicle battery 822 may be reduced and the cost may also be reduced compared to a conventional electric start and magneto power generation system.

In some embodiments, charging of ultracapacitor 812 may begin in response to receiving a user input. For example, the use may press a button to initiate charging of ultracapacitor 812. Upon receiving the user input, ISG controller 804 may determine an ultracapacitor level and start the engine as soon as it determines that sufficient energy is stored in ultracapacitor 812 to crank the engine. It should be appreciated that, in some embodiments, the ultracapacitor level may be continually or periodically determined prior to receiving the user input.

In some embodiments, charging of ultracapacitor 812 may begin as soon as the vehicle is turned on via a key switch 828 or other means. In such embodiments, the vehicle may indicate when starter-generator system 800 is ready to start the engine (e.g., notifies the user of an available start mode). In response, the user may press a button or rotates the key to a start position to initiate engine start.

In some embodiments, ISG controller 804 uses multiple sensors in combination to determine when starter-generator system 800 is ready to start the engine. For example, ISG controller 804 may use measurements of engine and/or ambient temperature, ultracapacitor bank voltage, and/or DC/DC converter current. ISG controller 804 may also consider the time history of these values, for example, noting when the ultracapacitor bank voltage exceeds a predetermined threshold and then waiting a predetermined period of time based on the engine temperature. It should be appreciated that ISG controller 804 may measure these values directly or receive them from UCM 810 or ECM 824 via digital communication means.

In some embodiments, ISG controller 804 may produce torque to assist manual pull starting of the engine. In such embodiments, a pushbutton may be integrated into a rope handle such that when the operator depresses the button and pulls on the rope, ISG controller 804 sends current to ISG 802 to produce torque in the forward direction. Alternatively, starter-generator system 800 may include a sensor for detecting when there is tension on the starting rope and initiating starting in response.

It should be appreciated that, in some embodiments, starter-generator system 800 may also be used to facilitate reversing the direction of engine rotation when used on 2-stroke engines, as described above in FIGS. 5-7.

Figure 10:
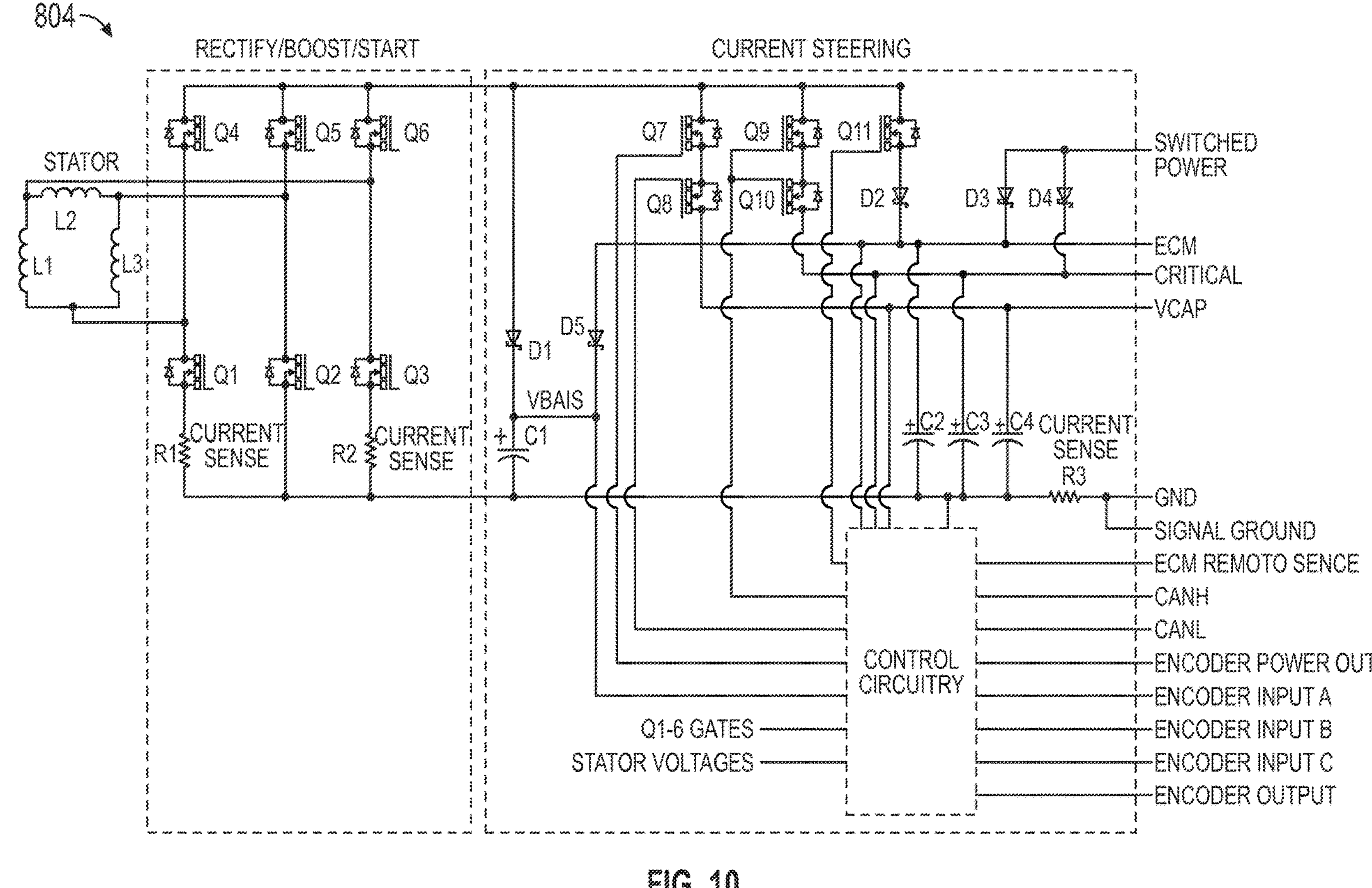
FIGS. 10, 11A, and 11B are example schematic circuit diagrams of portion of the system of FIG. 9.

Referring now to FIG. 10, an exemplary schematic circuit diagram of ISG controller 804 is shown. ISG controller 804 is configured to convert electrical power between a stator of ISG 802 and three-DC voltage buses. For example, inputs of ISG controller 804 include Switched Power, ECM Remote Sense, and Encoder inputs A-C. Switched Power is connected to a battery through a key switch (e.g., 828) to power-on ISG controller 804. ECM Remote Sense is an optional analog input to measure the ECM output at a point outside of ISG controller 804 in order to improve voltage control accuracy. Encoder inputs A-C are generated by external sensors based on a rotor position.

Outputs of ISG controller 804 include ECM 824 and Encoder Output. ISG controller 804 is configured to supply voltage to ECM 824. Encoder Output is an optional signal that may change state whenever one of the encoder inputs change state, for use by ECM 824 as a high resolution engine speed signal.

Additionally, bidirectional signals may be generated. For example, stator voltages are wired to a three-phase stator that may be Wye/Star or Delta-wound. VCAP is a power source input during engine start and a power output while the engine is running. CANH or CANL is a standard communications bus for transmitting status information, diagnostics, and reprogramming.

As shown in FIG. 10, ISG controller 804 has two main sections (i.e., a rectify/boost/start (RBS) section and a current steering section). Rectify/Boost/Start (RBS) section is responsible for converting between 3 phase AC and DC power. Current Steering section is responsible for directing power from a Vcap pin to RBS section during engine starting and for directing power from that section to ECM, Critical, and Vcap pins while the engine is running. In addition, control circuitry is configured to operate both sections based on the various inputs.

In RBS section, MOSFETs Q1-Q6 form a conventional three-phase bridge. Optional resistors R1 and R2 allow for stator current sensing when Q1 or Q3 respectively are on. Stator current sensing may also be accomplished with resistors in series with the stator leads or with Hall-effect or other current sensors on the stator leads. MOSFETs are controlled via signals from the control circuitry.

In Current Steering section, MOSFETs Q7 and Q8 are individually controlled. When Q7 is on current is allowed to flow from the RBS section to the Vcap pin through the body diode of Q8. When Q8 is on, current is allowed to flow in the opposite direction. MOSFETS Q9 and Q10 are controlled as a pair. When on, current flows from the RBS section to the Critical output. MOSFET Q11 is turned on to allow current to flow from the RBS section to the ECM pin through diode D2. Diodes D3 and D4 supply power from the Switched Power input to the ECM and Critical outputs prior to engine start. Once the engine has started, the ECM and Critical voltages will rise, blocking current from flowing through these diodes. Resistor R3 allows the GND pin current to be measured, and Capacitors C2-C4 provide filtering.

ISG control circuit is configured to measure voltage at the ECM, Critical, and Vcap pins as inputs to its control algorithm. Additionally, ISG control circuit may also measure the stator voltages to determine flywheel RPM or use the Encoder inputs. ISG control circuit includes 5 states: Wait, Engine Start, Engine Reverse Start, Boost, and Power Generation. In Wait state, all MOSFETs are off. In Engine Start state, RBS Section operates to produce starting torque and Current Steering Section operates supply power from Vcap. In Engine Reverse Start state, RBS Section operates to produce starting torque in the reverse direction, and Current Steering Section operates to supply power from Vcap. In Boost state, Current Steering Section operates to supply electrical power to the ECM, Critical, and Vcap pins during a manual start. For example, ISG control circuit is in Boost state during a pull-assist starting mode, which supports electric start with manual pull assist. Lastly, in Power Generation state, Current Steering Section operates to supply electrical power to the ECM, Critical, and Vcap pins.

ISG controller 804 keeps all MOSFETs off during the Wait state. Subsequently, ISG controller 804 transitions to the Boost state when the Encoder inputs indicate that the flywheel is rotating or AC voltage is detected on the stator leads. Alternatively, ISG controller 804 may transition to the Boost state in response to a signal received over the CAN bus.

Engine Start is accomplished by turning on Q8 and optionally Q7 (to reduce the voltage drop across Q7), and controlling the RBS section as a typical BLDC motor controller, with commutation control of Q1-Q6 and PWM control of Q4-Q6 to achieve a target motor current based on flywheel angle determined by the Encoder inputs, as shown in Table 1.

TABLE 1

Engine Start Operation

| Encoder ABC | Q1 | Q2 | Q3 | Q4 | Q5 | Q6 | Q7-Q8 | Q9-11 |
|---|---|---|---|---|---|---|---|---|
| 010 | On | Off | Off | Off | PWM | PWM | On | Off |
| 110 | On | On | Off | Off | Off | PWM | On | Off |
| 100 | Off | On | Off | PWM | Off | PWM | On | Off |
| 101 | Off | On | On | PWM | Off | Off | On | Off |
| 001 | Off | Off | On | PWM | PWM | Off | On | Off |
| 011 | On | Off | On | Off | PWM | Off | On | Off |

ISG controller 804 transitions to the Power Generation state after a predetermined time has passed since the beginning of engine start. Alternately, ISG controller 804 may transition to the Power Generation state when an error between the target motor current and the actual motor current exceeds a predetermined threshold for a predetermined period. ISG controller 804 transitions to the Wait state when the engine RPM falls below a predetermined threshold.

Moreover, Engine Reverse Start is accomplished by turning on Q8 and optionally Q7 (to reduce the voltage drop across Q7), and controlling the RBS section as a typical BLDC motor controller, with commutation control of Q1-Q6 and PWM control of Q4-Q6 to achieve a target motor current based on flywheel angle determined by the Encoder inputs, as shown in Table 1b.

TABLE 1b

Engine Reverse Start Operation

| Encoder ABC | Q1 | Q2 | Q3 | Q4 | Q5 | Q6 | Q7-Q8 | Q9-11 |
|---|---|---|---|---|---|---|---|---|
| 010 | Off | On | On | PWM | Off | Off | On | Off |
| 110 | Off | Off | On | PWM | PWM | Off | On | Off |
| 100 | On | Off | On | Off | PWM | Off | On | Off |
| 101 | On | Off | Off | Off | PWM | PWM | On | Off |
| 001 | On | On | Off | Off | Off | PWM | On | Off |
| 011 | Off | On | Off | PWM | Off | PWM | On | Off |

ISG controller 804 transitions to the Power Generation state after a predetermined time has passed since the beginning of Engine Reverse Start. Alternately, ISG controller 804 may transition to the Power Generation state when the error between the target motor current and the actual motor current exceeds a predetermined threshold for a predetermined period. ISG controller 804 transitions to the Wait state when the engine RPM falls below a predetermined threshold.

Additional details of features of a power boosting regulator may be disclosed in U.S. Pat. No. 10,793,226, issued Oct. 6, 2020, and entitled "POWER BOOST REGULATOR", U.S. Pat. No. 10,870,465, issued Dec. 22, 2020, and entitled "POWER BOOST REGULATOR", U.S. Pat. No. 10,780,949, issued Sep. 22, 2020, and entitled "POWER BOOST REGULATOR", and U.S. Pat. No. 10,974,790, filed Apr. 13, 2021, and entitled "POWER BOOST REGULATOR", the complete disclosures of which are expressly incorporated by reference herein. Operation in the Power Generation state, control period Tctrl is divided into 4 parts: Tecm, Tcritical, Tcap, and Tshunt. Each of the first three time periods is increased when the respective pin is below the target voltage for that pin and decreased when the voltage is high. Tshunt is set to the amount of time remaining in Tctrl. A non-negative minimum value for Tshunt (Tmin) is predetermined based on engine RPM. The outputs are prioritized as follows:

1. If (Tecm+Tmin)>Tctrl, set set Tshunt=Tmin, Tecm=Tctrl−Tmin, and set Tcritcal and Tcap to zero
2. Else if (Tecm+Tmin+Tcritical)>Tctrl, set Tshunt=Tmin, set Tcritical=Tctrl−Tmin−Tecm, and set Tcap to zero
3. Else if (Tecm+Tmin+Tcritical+Tcap)>Tctrl, set Tshunt=Tmin and set Tcap=Tctrl−Tmin−Tecm−Tcritical
4. Else set Tshunt=Tctrl-Tecm-Tcritical-Tcap In each time period ISG controller 804 is operated in accordance with Table 2.

TABLE 2

Power Generation Operation

| Time Period | Q1-Q3 | Q7 | Q8 | Q9-10 | Q11 |
|---|---|---|---|---|---|
| Tecm | Off | On | Off | Off | On |
| Tcritical | Off | On | Off | On | Off |
| Tcap | Off | On | On | Off | Off |
| Tshunt | On | On | Off | Off | Off |

ISG controller 804 transitions to the Boost state if Vcap falls below the ECM target voltage. ISG controller 804 transitions to the Wait state if the engine RPM falls below a predetermined threshold or a Direction Reversal command is received over CAN. In an alternative implementation, MOSFETs Q1-Q6 are controlled based on the Encoder inputs and Table 1 when not in the Tshunt time period.

In the Boost state ISG controller 804 is operated as defined by Table 3, following the same prioritization rules for the time periods defined for the Power Generation state. Control in this manner maintains the prioritization of the ECM and Critical outputs over Vcap. In an alternative implementation, MOSFETs Q1-Q6 are controlled based on the Encoder inputs and Table 1 or 1b when not in the Tshunt time period.

TABLE 3

| Boost Operation | | | | | | |
|---|---|---|---|---|---|---|
| Time Period | Q1-Q3 | Q4-6 | Q7 | Q8 | Q9-10 | Q11 |
| Tecm | Off | Off | Off | Off | Off | On |
| Tcritical | Off | Off | Off | Off | On | On |
| Tcap | Off | Off | On | On | Off | On |
| Tshunt | On | Off | Off | Off | Off | On |

ISG controller 804 transitions to the Power Generation state when Vcap exceeds the ECM target voltage. ISG controller 804 transitions to the Wait state when the engine RPM falls below a predetermined threshold. Optionally, ISG controller 804 transitions to the Engine Start state when the engine controller sends a direction reversal command.

Figure 11A:
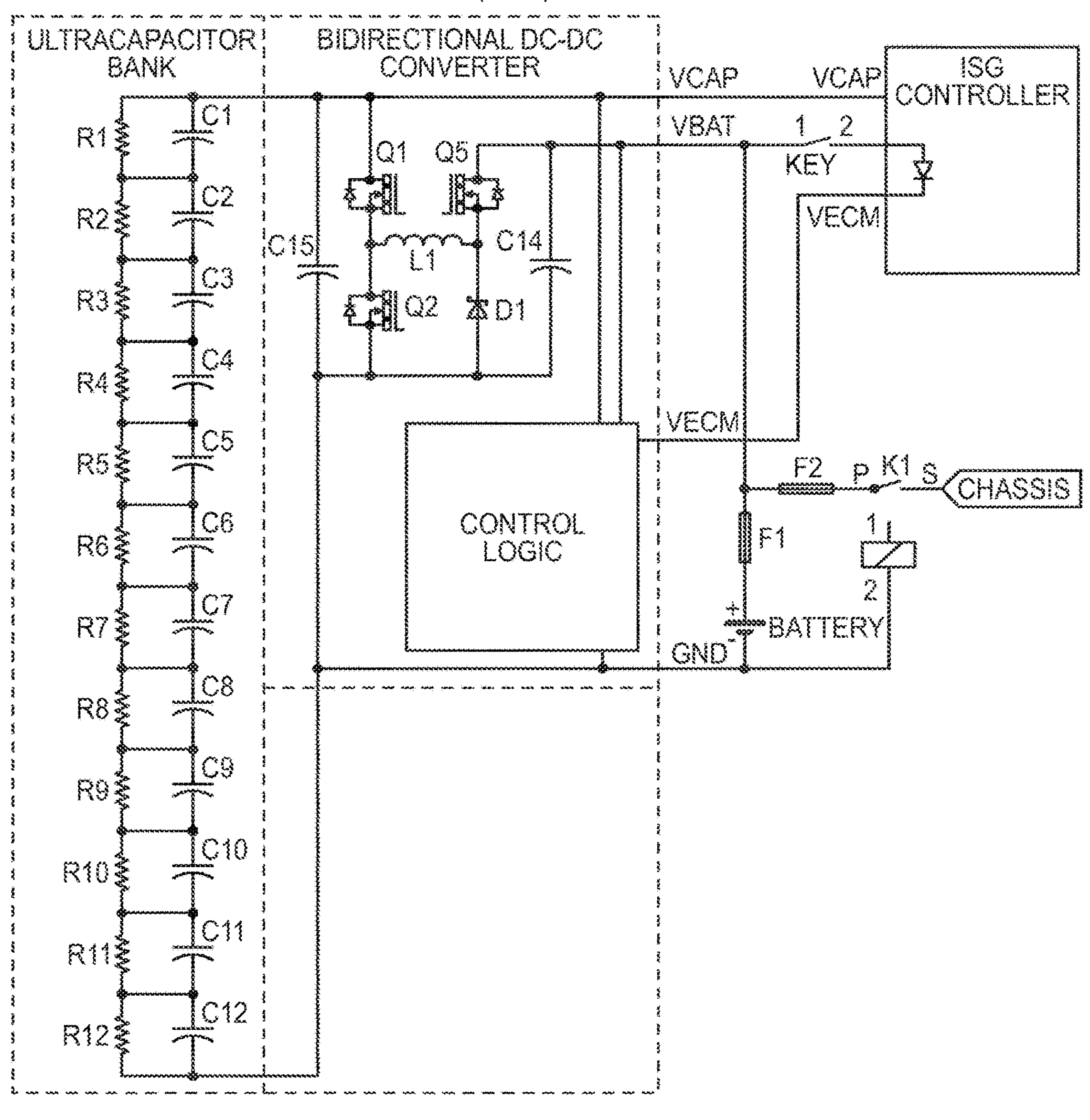

Referring now to FIG. 11A, an exemplary schematic circuit diagram of ultracapacitor module 810 is shown. In the illustrative embodiment, ultracapacitor Bank 812 and DC-DC Converter 814 are combined into one module 810. Ultracapacitor Module (UCM) 810 includes a DC/DC converter 814 to charge ultracapacitors 812 at 62A max input current and then supply up to 41A at 14.5V to charge the battery 822 and power chassis loads 818. DC/DC converter 814 continues to supply current during engine starting, thereby reducing the size of the capacitor bank.

Ultracapacitor Bank 812 consists of multiple ultracapacitors wired in series (C1-C12) to increase the operating voltage. Ultracapacitors may also be wired in parallel to increase energy storage and increase power delivery. Resistors R1-R12 are present in Ultracapacitor Bank 812 to balance the voltage across the ultracapacitors to prevent overcharging of one capacitor in the string. Resistors are selected to dissipate between 0.01 and 1.0 W from a fully charged ultracapacitor. DC/DC converter 814 is composed of a half-bridge arrangement of MOSFETs Q1 and Q2, inductor L1, MOSFET Q5, diode D1, filter capacitors C14 and C15, and Control Logic.

In the illustrative embodiment, DC/DC converter 814 has four Modes: Start mode, Mode 1*a*, Mode 1*b*, and Mode 2. In the Start mode, DC/DC converter 814 waits for a request signal to begin operation in either Mode 1*a* or 1*b*. However, the request signal may be an optional features. In Mode 1*a*, voltage VCAP is less than VBAT and DC/DC converter 814 steps down the VBAT voltage to charge the Capacitor Bank. In Mode 1*b*, VCAP is at least VBAT and DC/DC converter 814 steps up the VBAT voltage to charge the Capacitor Bank 812. In Mode 2, VCAP is greater than VBAT and DC/DC converter 814 steps down the VCAP voltage to supply power to VBAT.

At start-up, ultracapacitors may be fully discharged. In such case, UCM 810 begins operation by PWM control of MOSFET Q5. This is Mode 1*a*. When Q5 is on, current flows from battery 822 through Q5, L1, Q1, and Ultracapacitor Bank 812. Inductor L1 limits the current rise. When Q5 is shut off, current flows through D1 instead of Q5 and L1 limits the current decay.

Once the voltage across the Ultracapacitor Bank (VCAP) has risen to nearly the level of the battery (VBAT), DC/DC converter 814 switches to Mode 1*b*. In Mode 1*b*, Q5 is turned fully-on (100% duty), and Q1 and Q2 are PWMed in a complimentary fashion such that only one is on at a time. When Q2 is on L1 is effectively connected across battery 822 and current rises. When Q1 is on, L1 supplies current to the ultracapacitors 812 and L1's current decays. In this way, the Ultracapacitor Bank is charged to a voltage greater than the Battery Voltage.

In Mode 2, UCM 810 controls MOSFET Q5 on 100% of the time and PWMs Q1 and Q2 with complementary signals. The VCAP bus is at a higher voltage than the VBAT bus, so when Q1 is on current flows from VCAP through Q1, L1, and Q5 to VBAT, and the current in L1 climbs. When Q2 is on current flows from ground through Q2, L1, and Q5 and the current in L1 falls.

In the illustrative embodiment, ISG Controller 804 regulates the DC link voltage VCAP to 29V when the engine is running and Converter 814 operates in Mode 2 with Q1 and Q2 PWMed in complementary fashion at a fixed 50% duty cycle. In this configuration, the VBAT output of the Converter equals the VCAP input times the duty cycle, such that 14.5V is supplied to Battery 822. The fixed duty cycle prevents interactions with VCAP voltage regulation and allows ISG Controller 804 to reduce the power supplied to Battery 822 when there is insufficient total power available from ISG 802 to meet the total required by the three ISG Controller outputs.

UCM 810 may disable PWM control or reduce the duty cycle of Q1 if the VCAP voltage falls below a predetermined voltage, typically 17 V. This maintains VCAP voltage above VECM and keeps ISG Controller 804 in the normal operating mode.

In one embodiment, a Control Logic in DC/DC converter 814 monitors voltage VECM to determine the mode to operate in. When VECM is between 6 and 15V, DC/DC converter 814 charges Ultracapacitor Bank 812 in either Modes 1*a* or 1*b*, based on voltage VCAP relative to voltage VBAT. When the Control Logic measures greater than 15V on VECM it transitions to Mode 3. In another embodiment, a state of a digital or serial signal from ISG controller 804 indicates whether DC/DC converter 814 should operate in Mode 1 or Mode 2.

The System may be used without battery 822 if the vehicle has a manual starting option, such as a rope-pull starter. In this case, the voltage on VECM transitions from near zero volts to greater than 15V and DC/DC converter 814 transitions directly to Mode 2.

Figure 11B:
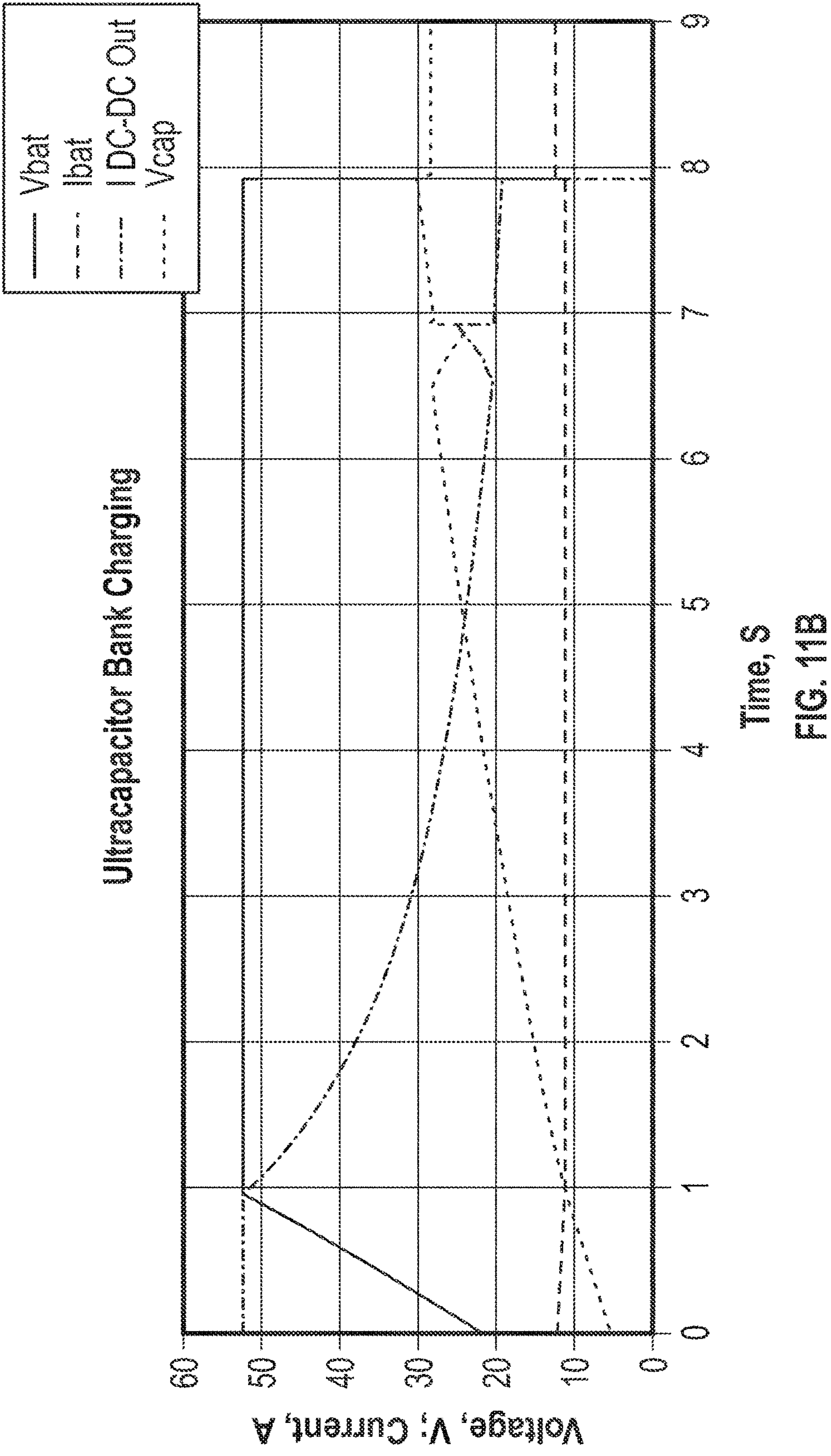

FIG. 11B illustrates key voltages and currents in UCM Modes 1 and 2. In Mode 1*a*, the Ultracapacitor Bank voltage Vcap (in red) is less than Battery voltage Vbat (in green), and the DC-DC Converter current (dark blue) is at its maximum. This current charges the Ultracapacitor Bank 812. In Mode 1*a*, the Battery current Ibat (light blue) rises towards its maximum. At the transition between Modes 1*a* and 1*b*, the two voltages are equal as are the two currents. In Mode 1*b*, DC/DC converter 814 operates with fixed battery current, which results in nearly constant input power. The output current falls as Vcap increases due to the limited input power. At a point determined by ISG controller 804, it begins to generate torque to turn the crankshaft, drawing power from DC/DC converter 814 and Ultracapacitor Bank 812. DC/DC converter 814 continues to operate in Mode 1*b* during and following engine start in order to maximize the power available for starting and to prepare for a second engine start event if needed. When the predetermined condition is reached (VECM above a threshold voltage or upon a signal from ISG Controller 804), UCM 810 transitions to Mode 2.

As Mode 2 operation has been described, the current input into the VCAP terminal of UCM 810 is zero when Q1 is off and equal to the inductor current when Q1 is on. Since ISG Controller 804 cannot react quickly enough to switch its output current on and off during each cycle, large capacitors in ISG Controller 804 and in DC/DC Converter 814 are required to provide filtering. This is the function of C15 in the schematic shown in FIG. 11A.

In the illustrative embodiment, DC/DC Converter 814 is a multiphase converter with two phases. In this configuration, there are two inductors L1 and L2 and two half bridges (Q1+Q2 and Q3+Q4). Initial charging of Ultracapacitor Bank 812 is the same as the charging described above, but the current is carried by both inductors and both Q1 and Q3.

When Q5 reaches 100% duty cycle, the converter logic begins PWM of both half bridges at the same frequency but with a 180° offset. For example, if the PWM period is 2 μs (500 kHz switching frequency), then the turn-on of Q1 and Q3 is offset by 1 μs. Q2 is controlled complementary to Q1 and Q4 is controlled complementary to Q3. This is configured to reduce voltage and current ripple, as it effectively doubles the PWM switching frequency. This reduction reduces the minimum size of capacitors C14 and C15.

When the engine is running and ISG Controller 804 is regulating the DC link voltage VCAP to 29V, Q1 and Q3 are controlled at 50% duty cycle, such that each time Q1 is turned off Q3 is turned on, and vice-versa. Q2 and Q4 continue to be controlled complementary to their respective counterparts. In this way, current from VCAP is alternately fed to L1 and L2 without interruption, further reducing voltage and current ripple. At all times the current into DC/DC Converter 814 is near its average value, varying only with the rise and fall of the inductor currents.

Figure 12A:
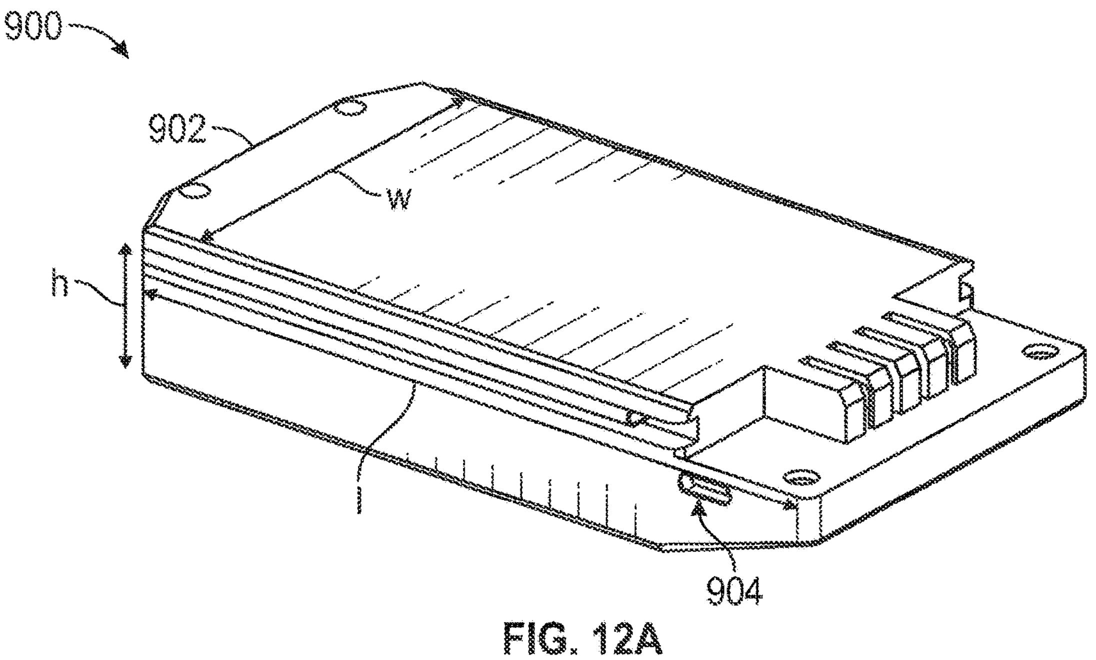
FIGS. 12A and 12B illustrates a removable lithium-ion battery, according to an example of the present disclosure.
Figure 12B:
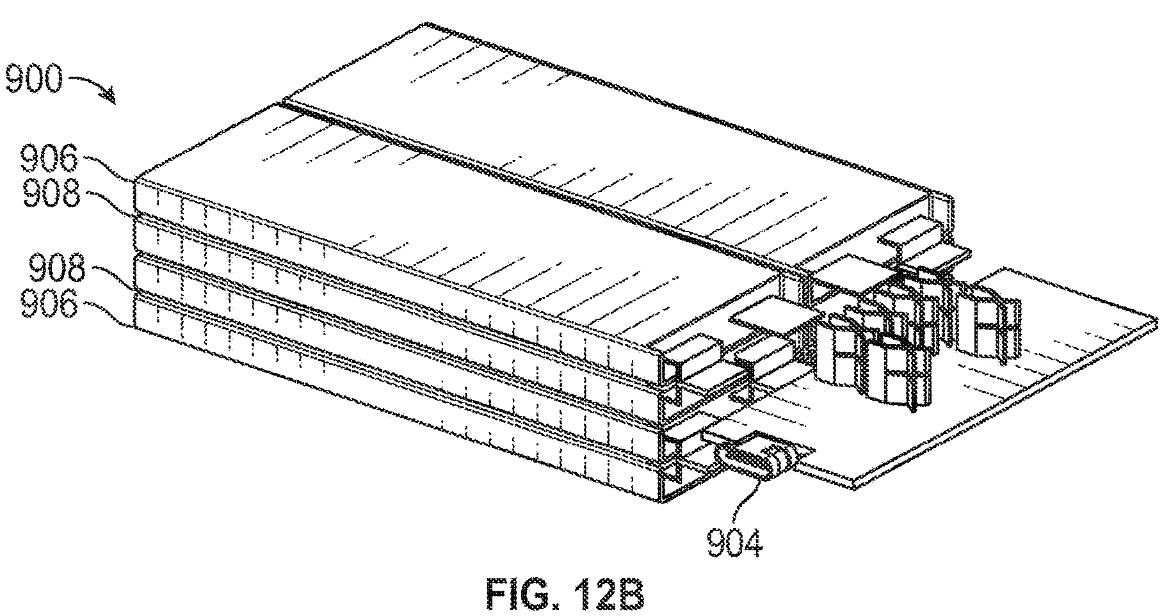

Referring to FIGS. 12A and 12B, a removable lithium-ion battery 900 is described. Lithium-ion battery 900 is removably coupled to a vehicle to perform various functions. For example, removable lithium-ion battery 900 may be used off-board charging, higher voltage for integrated-starter-generator systems, a bidirectional DC/DC converter for charging off of vehicle power when the engine is running, and/or powering vehicle electrical systems at other times. Additionally, removable lithium-ion battery 900 may include a pushbutton and a plurality of LEDs for a status and state-of-charge indication. For example, in some embodiments, a single press of the pushbutton may cause the removable battery 900 to display the state-of-charge by turning on one or more of the plurality of LEDs for a period of time (e.g., 5 seconds). Additionally, a double press of the pushbutton may cause the removable battery 900 to turn on or off a white LED for use as a flashlight. A triple press of the pushbutton may cause the battery to turn on or off a self-heating mode to function as a hand warmer and/or preheat the removable battery 900 prior to be coupled to the vehicle.

To do so, lithium-ion battery 900 includes a housing 902 that includes a USB port 904 and multiple cells 906 in series configuration with integral cell heating element 908, charge circuit, and/or a serial communication pin. Lithium-ion battery 900 further includes a bidirectional DC/DC converter (e.g., 1012 in FIG. 13) to allow lithium-ion battery 900 to charge from vehicle power when the engine is running, supply power to the vehicle for fuel pump and engine controller prior to starting, and power in-vehicle infotainment system and other connected vehicle functions when the key is off.

Additionally, or alternatively, in some embodiments, lithium-ion battery 900 may further include a button (not shown) and light-emitting diode (LED) lights (not shown) to indicate a battery state of charge. For example, when a user pushes the button, the LED lights illuminates to indicate the battery state of charge. Additionally, or alternatively, when the user taps the button three-times, battery pre-heat or hand warmer function using the integral cell heating element 908 may be activated. Additionally, or alternatively, lithium-ion battery 900 may include optional LED flashlight.

Additionally, or alternatively, lithium-ion battery 900 may be used with an integrated starter-generator (ISG) (e.g., 1008 in FIG. 13) to provide higher voltage to improve starting torque. Additionally, or alternatively, the serial communication link may be used to allow an ISG controller (e.g., 1010 in FIG. 13) to control the integral cell heating element 908 and the disconnect switch. In some embodiments, removable lithium-ion battery 900 may further include security functionality via secure communications with a vehicle.

Additionally, or alternatively, lithium-ion battery 900 may include a disconnect switch (not shown) to remove battery voltage from terminals when the battery is not installed. As described further below, lithium-ion battery 900 may include four connections to connect to start power, constant power, serial communication via local interconnect network (LIN), and ground.

Figure 13:
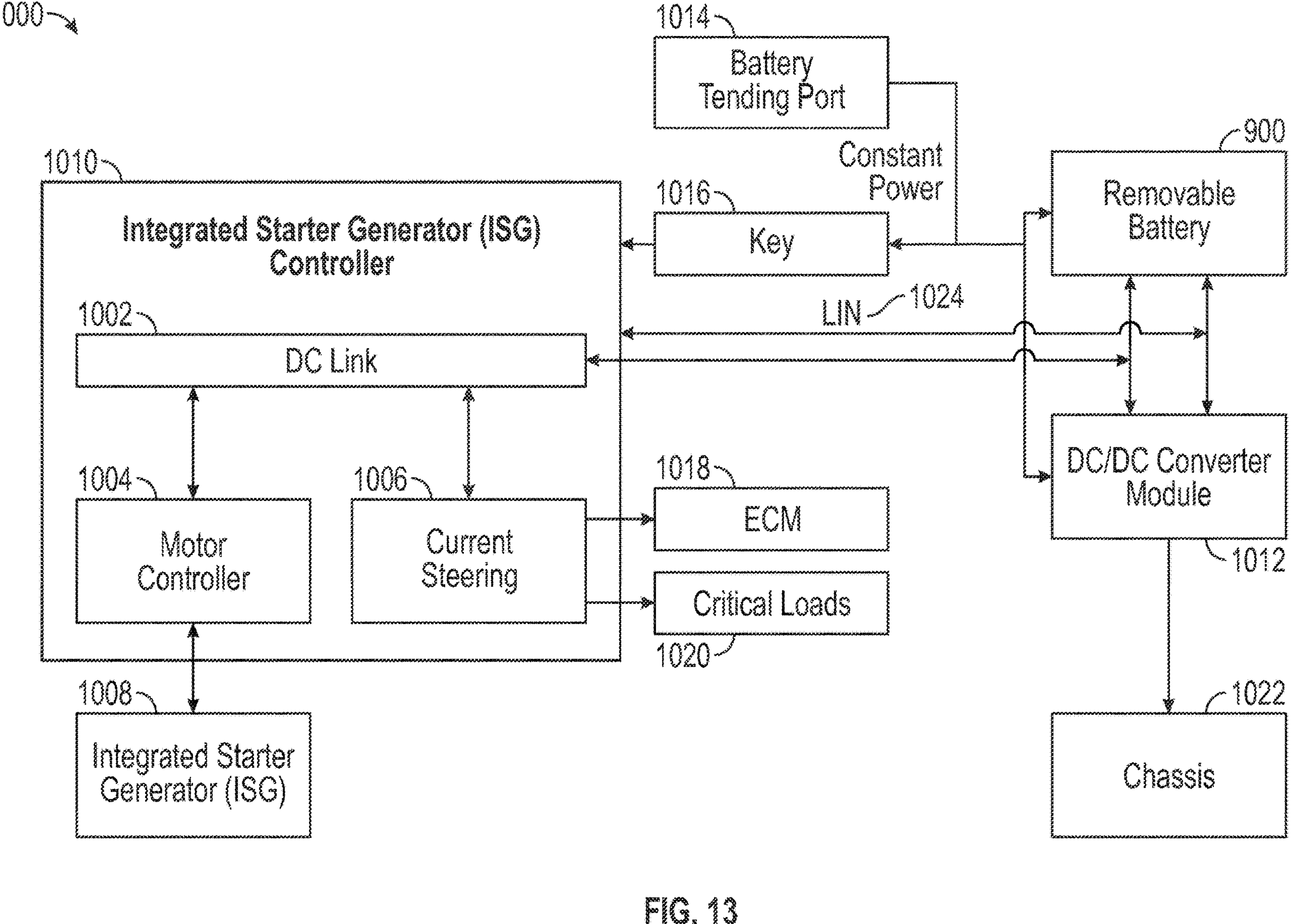
FIG. 13 illustrates a system for supplying power to an integrated starter-generator (ISG) controller for vehicle starting, according to an example of the present disclosure.

Referring now to FIG. 13, a removable lithium-ion battery system 1000 for supplying power to an integrated starter-generator (ISG) controller for vehicle starting is described. Removable starting battery system 1000 includes an integrated starter-generator (ISG) controller 1010, an integrated starter-generator (ISG) 1008, and a bidirectional DC/DC converter module 1012. Lithium-ion battery 900 is operatively coupled to integrated starter-generator (ISG) 1008 to provide higher voltage to improve starting torque. ISG controller 1010 is configured to operate as a motor controller 1004 during engine starting and as a current steering 1006 afterwards. In the illustrative embodiment, current steering 808 is embodied as a voltage regulator with current-steering functionality.

Lithium-ion battery 900 may transmit status data to ISG controller 1010 including state-of-change, temperature, battery voltage, and current of lithium-ion battery 900. Lithium-ion battery 900 may also calculate and transmit its power capacity based on its temperature and state-of-charge.

Additionally, ISG controller 1010 is operatively coupled to removable lithium-ion battery 900 to control operations of the lithium-ion battery 900. For example, ISG controller 1010 may be configured to control integral cell heating element 908 and the disconnect switch via a serial communication link. The serial communication link allows for bidirectional communication with ISG controller 1010 using a local interconnect network (LIN) 1024 or a similar protocol.

Figure 14:
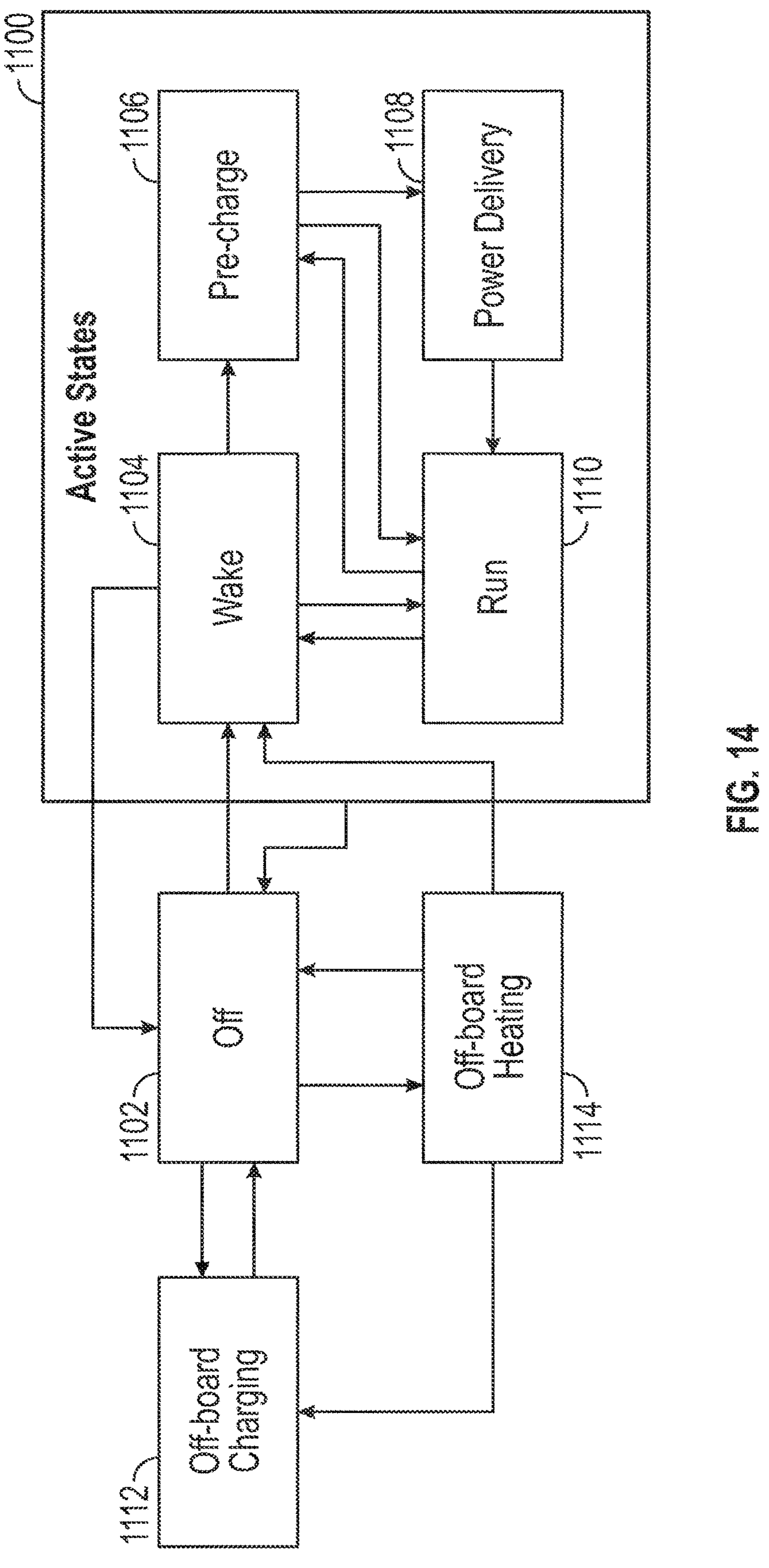
FIG. 14 illustrates different battery operating states of the removable lithium-ion battery of FIGS. 12 and 13.

Additionally, ISG controller 1010 is configured to transmit commands to lithium-ion battery 900 to change a battery operating state of lithium-ion battery 900 to facilitate engine starting. To do so, removable lithium-ion battery 900 supports different battery operating states, as illustrated in FIG. 14. For example, the battery operating states include an off state 1102, a wake state 1104, a pre-charge state 1106, a power delivery state 1108, and a run state 1110. Additionally, as described above, lithium-ion battery 900 includes four terminals or connections: battery or start power (e.g., 29V battery power supplied to a DC link capacitor 1002 of ISG controller 100 and/or a chassis 1022 of a vehicle via DC/DC converter module 1012), constant power (e.g., 12V), a serial communication (e.g., via a local interconnect network (LIN) 1024), and ground (not shown).

For example, in off state 1102, lithium-ion battery 900 is configured to supply power to a vehicle at reduced voltage to reduce battery drain. In wake state 1104, lithium-ion battery 900 is configured to supply constant power (e.g., 12V power) to the vehicle to power ECM 1018 and a fuel pump (e.g., 1020). In pre-charge state 1106, lithium-ion battery 900 is configured to supply 12V power to the vehicle (e.g., chassis 1022) and supply a capacitor charging current to ISG controller 1010 in preparation for connecting battery voltage to ISG controller 1010. In power delivery state 1108, lithium-ion battery 900 is configured to supply both 12V and 29V power to the vehicle for engine starting. In run state 1110, lithium-ion battery 900 is configured to receive 12V power from the vehicle for charging and to maintain optimum operating temperature. To do so, in the illustrative embodiment, lithium-ion battery 900 is configured to transmit status data to ISG controller 1010 including state-of-change, temperature, battery voltage, and current of lithium-ion battery 900. Lithium-ion battery 900 may also be configured to calculate and transmit its power capacity based on its temperature and state-of-charge.

Additionally, the battery operating states include an off-board charging state 1112 and an off-board heating state 1114 for controlling off-board charging feature and off-board heating feature of lithium-ion battery 900, respectively.

It should be appreciated that removable lithium-ion battery 900 including one or more features described herein is configured to reduce weight compared to a conventional battery, improves cold-start capability, and reduces battery maintenance during off-season.

Figure 15:
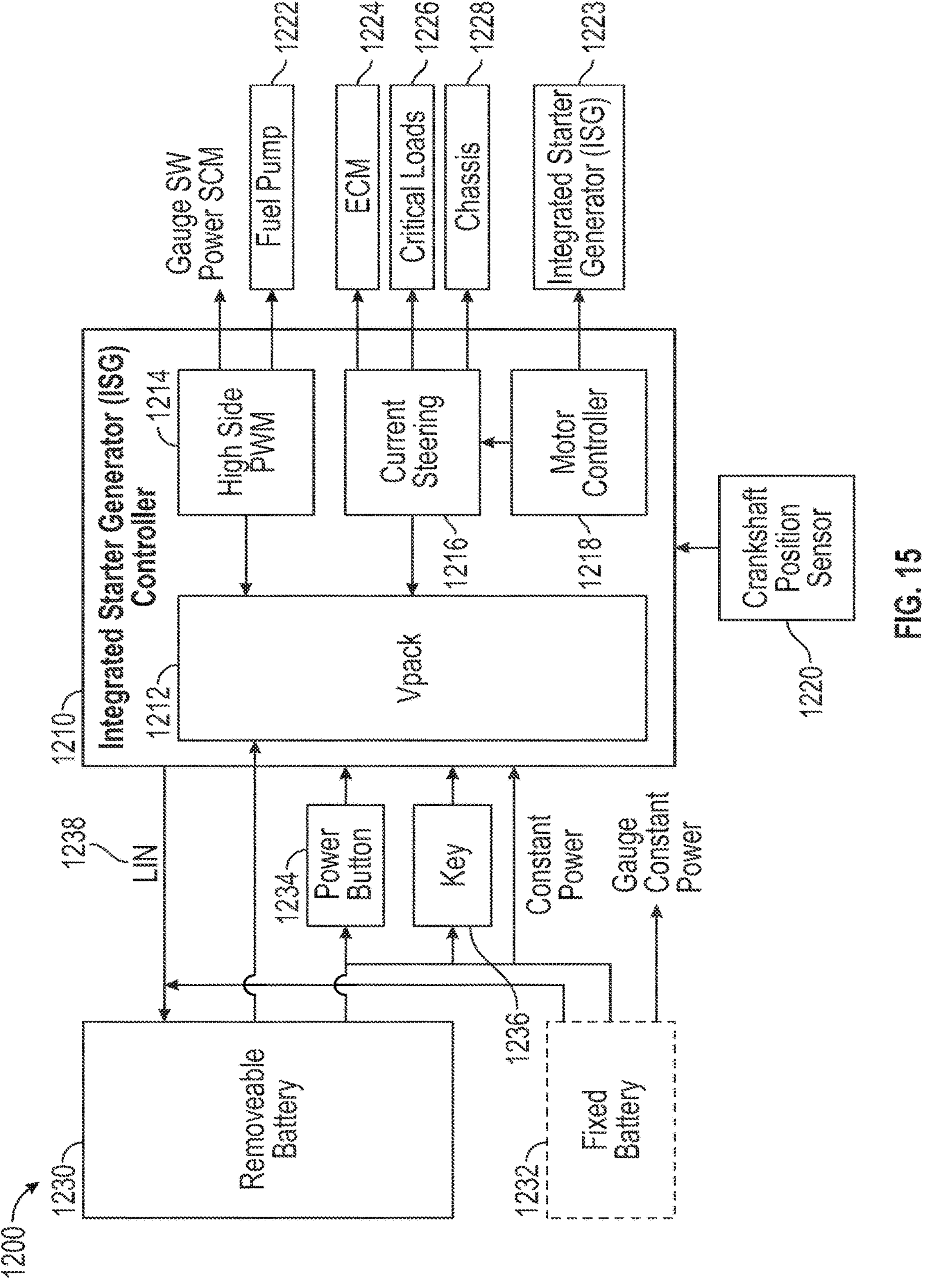
FIG. 15 illustrates a system including a removable battery for supplying power to an integrated starter-generator (ISG) controller for vehicle starting, according to an example of the present disclosure.
Figure 17A:
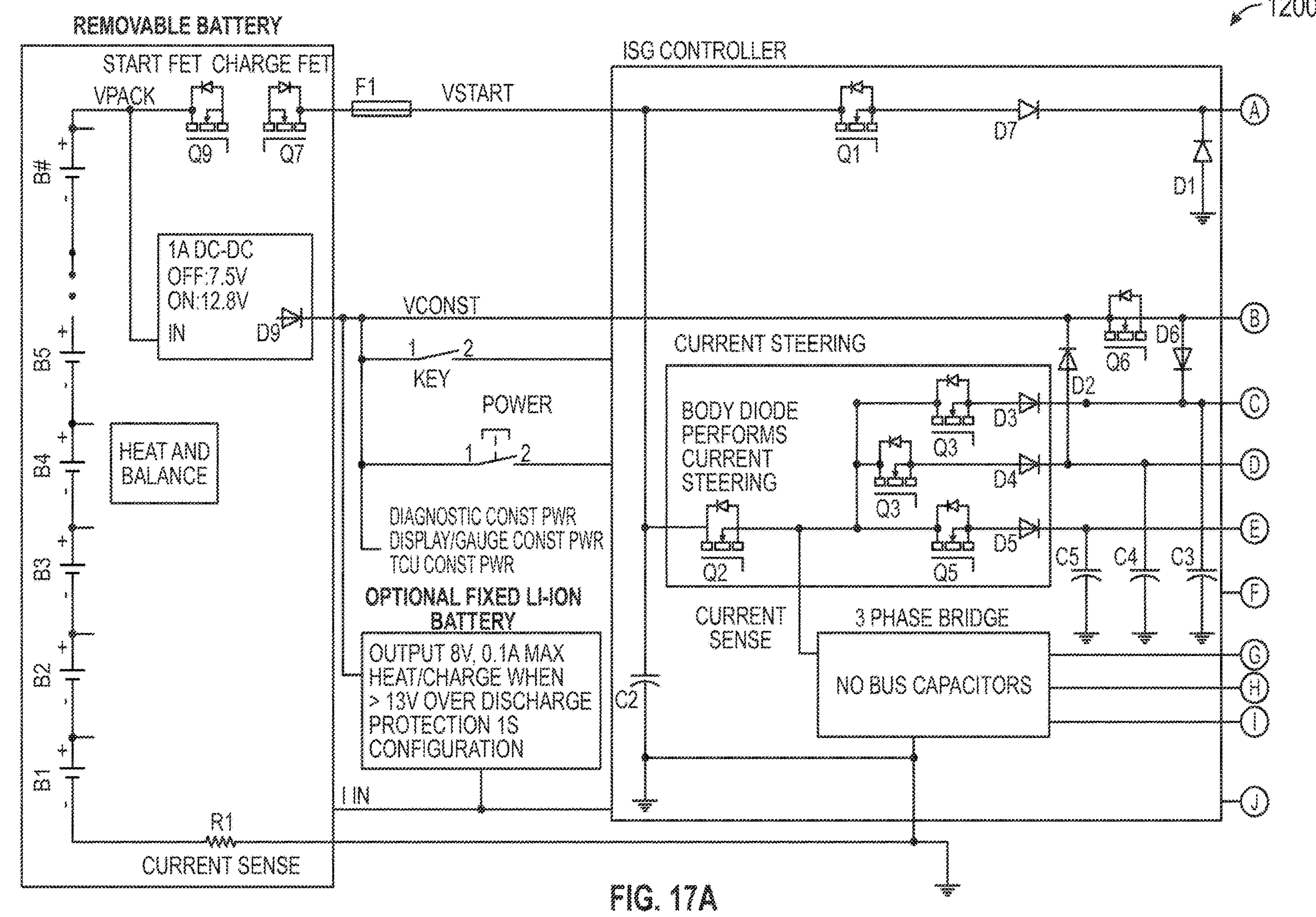
FIGS. 17A, 17B, and 18 are example schematic circuit diagrams of portion of the system of FIG. 15.
Figure 17B:
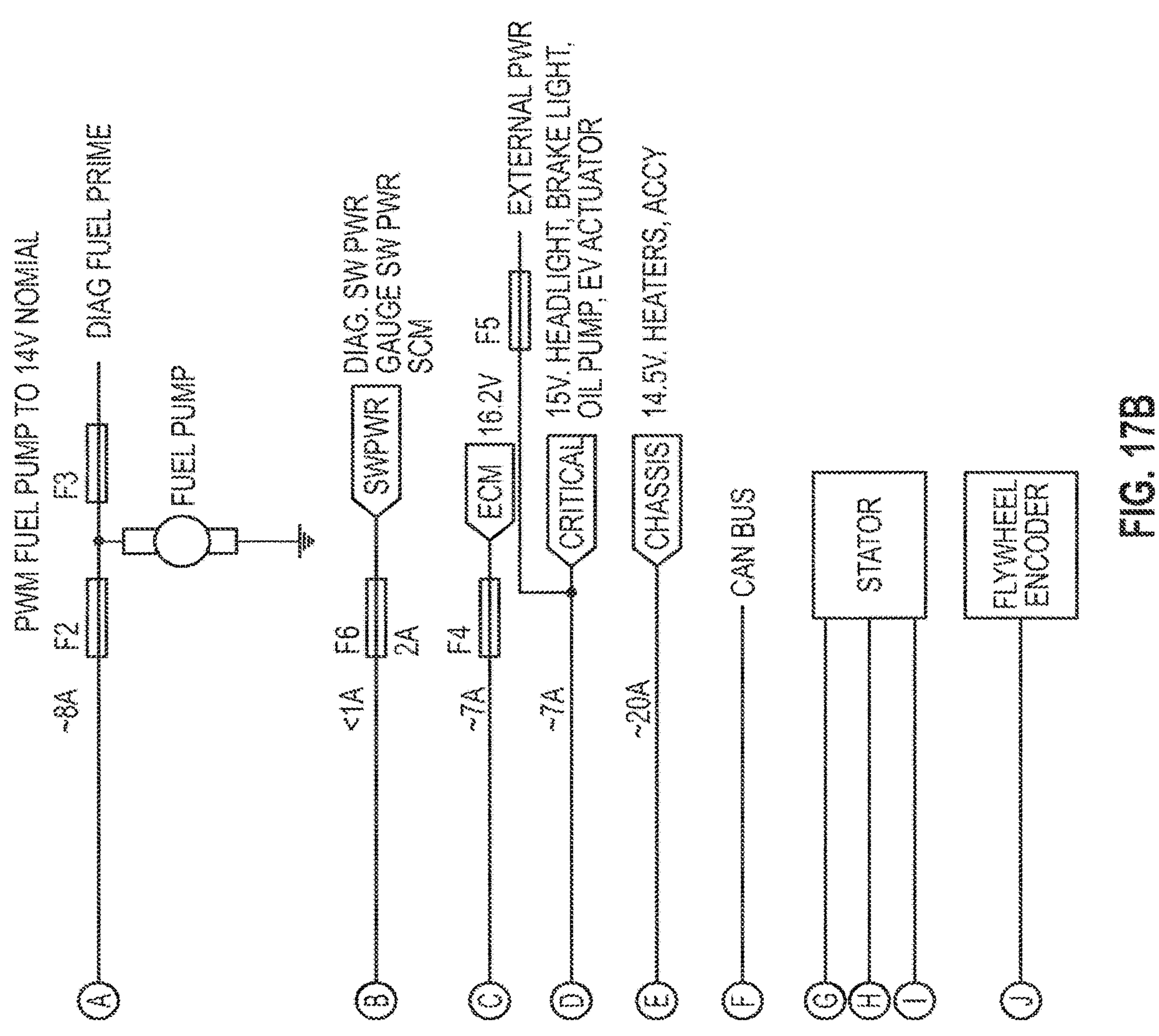

Referring to FIG. 15, an alternative embodiment of a removable lithium-ion battery system 1200 for supplying power to an integrated starter-generator (ISG) controller for vehicle starting is described. An exemplary schematic circuit diagram of removable lithium-ion battery system 1200 is shown in FIG. 17. Removable lithium-ion battery system 1200 include components similar to those components included and described in removable lithium-ion battery system 1000. In the illustrative embodiment, a high voltage, high power removeable lithium-ion battery 1230 provides power to an integrated starter-generator (ISG) controller 1210, which supplies power to a fuel pump 1222, an engine control module (ECM) 1224, and an integrated starter-generator (ISG) 1222 to start the engine. As described further below, removeable lithium-ion battery 1230 may be used in order to reduce weight, extend storage time, and prevent over-discharge damage. Removeable lithium-ion battery 1230 allows removable lithium-ion battery system 1200 to perform instant starting and does not require charging or heating time prior to engine start. Additionally, removable lithium-ion battery system 1200 does not require battery maintenance between riding seasons. Removable lithium-ion battery system 1200 does not need harness diodes, capacitors, or relays and supports telematics.

ISG controller 1210 includes current steering, motor control, and high-side PWM functionality. For example, ISG controller 1210 is configured to operate as a motor controller 1218 during engine starting and as a current steering 1216 afterwards. In the illustrative embodiment, current steering 808 is embodied as a voltage regulator with current-steering functionality. Additionally, ISG may be configured to perform a secure identification of lithium-ion battery 1230 via LIN 1238 when a power button 1234 is pressed.

Removeable lithium-ion battery 1230 is configured to supply power to ISG controller 1210 for vehicle starting. In some embodiments, removeable lithium-ion battery 1230 may function as a key 1236. Removeable lithium-ion battery 1230 has a voltage greater than a typical vehicle starting battery. Lithium-ion battery 1230 is also configured to supply nominal 12V power to the vehicle when the engine is not running. Removeable lithium-ion battery 1230 uses its state-of-charge and temperature to calculate a maximum discharge current, which is sent to ISG controller 1210. ISG controller 1210 uses the engine temperature and time stopped to determine required starting power. When the required starting power is less than the available power, lithium-ion battery system 1200 indicates that the engine is ready to start.

In some embodiments, removable lithium-ion battery system 1200 allows for batteryless manual starts when the required starting power is more than the available power and/or when removeable battery 1230 is absent. In some embodiments, a batteryless start or pull start may be initiated by the operating pulling the start rope. This spins the flywheel, which produces voltage and current in the stator and powers ISG controller 1210. In response, ISG controller 1210 may determine that a pull-start is in process by measuring a frequency of the AC stator voltage and/or observing a changing position reported by a crankshaft position sensor (CPS) 1220.

Additionally, ISG controller 1210 may shunt the stator current to build current at a minimum duty cycle determined from the flywheel RPM. When not being shunted, current flows to the current-steering circuitry. As shown in the exemplary schematic circuit diagram FIG. 17, MOSFET Q3 may be turned on to charge C3 and power the engine controller. The body diode in Q2 may cause current to also flow to charge C2. Additionally, MOSFET Q1 may be turned on at a high initial duty cycle (>95%) $DC_0$ to supply maximum power to fuel pump 1222 while C2 is being charged. To do so, ISG controller 1210 may begin PWM operation of MOSFET Q1 to power fuel pump 1222 from removable battery 1230, ramping the duty cycle from zero to min ($DC_0$,14V/V_C2), where $DC_0$ is the maximum duty cycle for the Q1 drive circuitry and V_C2 is the voltage on capacitor C2. When the ECM voltage rises to a predetermined threshold, MOSFET Q3 may be turned off for part of each cycle to direct more current to C2. Furthermore, when the voltage on C2 reaches a predetermined threshold, the shunting duty cycle of the three-phase bridge may be increased to prevent overcharging of C2 and C3. When a predetermined time has passed since the start of the pull start, ISG controller 1210 may transition to the run state.

In the Run state, ISG controller 1210 uses a fixed PWM period T. Each PWM period is divided into a time T1 where the stator is shunted by the three-phase bridge, a time T2 where current flows through Q2, and times T3-T5 where current flows through Q3-Q5 respectively. PID control loops determine times T2-T5 to maintain each output at its predetermined thresholds. The flywheel RPM determines a minimum shunting time T1min. When the sum (T1min+T2+ . . . +T5) is less than T, T1 is set to T−(T2+ . . . +T5). When the sum (T1min+T2+ . . . . T5) is greater than T, T1 is set to T1min and T5 is reduced so that (T1+ . . . +T5) is equal to T. Since no time periods can be negative, if necessary T5 is set to 0 and T4 is reduced. This continues until T=(T1+ . . . +T5).

When removeable battery 1230 is absent, the target voltage on C2 is set to twice the target fuel pump voltage to produce a 50% duty cycle on Q1 so that D1 and D7 see equal average current. ISG controller 1210 may determine that removeable battery 1230 is absent if data is not received from removeable battery 1230 via LIN bus 1238. When removeable battery 1230 is present but too cold to accept charge, the target voltage on C2 is set to a voltage that is lower than the pack voltage to prevent charging of the removable battery, typically the same voltage as for the no-battery condition. When removeable battery 1230 is present and able to accept current, the voltage on C2 is first raised to the pack voltage. ISG controller 1210 then determines the average current draw through Q1 as the current out of the 3 phase bridge times the duty cycle of Q2.

In some embodiments, removable lithium-ion battery system 1200 includes a fixed lithium-ion battery 1232 to provide power when the removeable lithium-ion battery 1230 is absent. Fixed lithium-ion battery 1232 may include charge/discharge circuitry, a temperature sensor, a battery cell, and heating circuitry. For example, in the off state, fixed lithium-ion battery 1232 is configured to output 8V with a current limit of approximately 100 mA. When the voltage on its Constant Power pin is greater than 13V and the battery is too cold to charge, it turns on a heater, powered from the Constant Power pin. When an acceptable temperature is reached, it takes power from the Constant Power pin to recharge. An optional LIN serial connection may be used to provide status information to ISG controller 1210, such as temperature, SOC, heater status, and any detected fault conditions.

Figure 18:
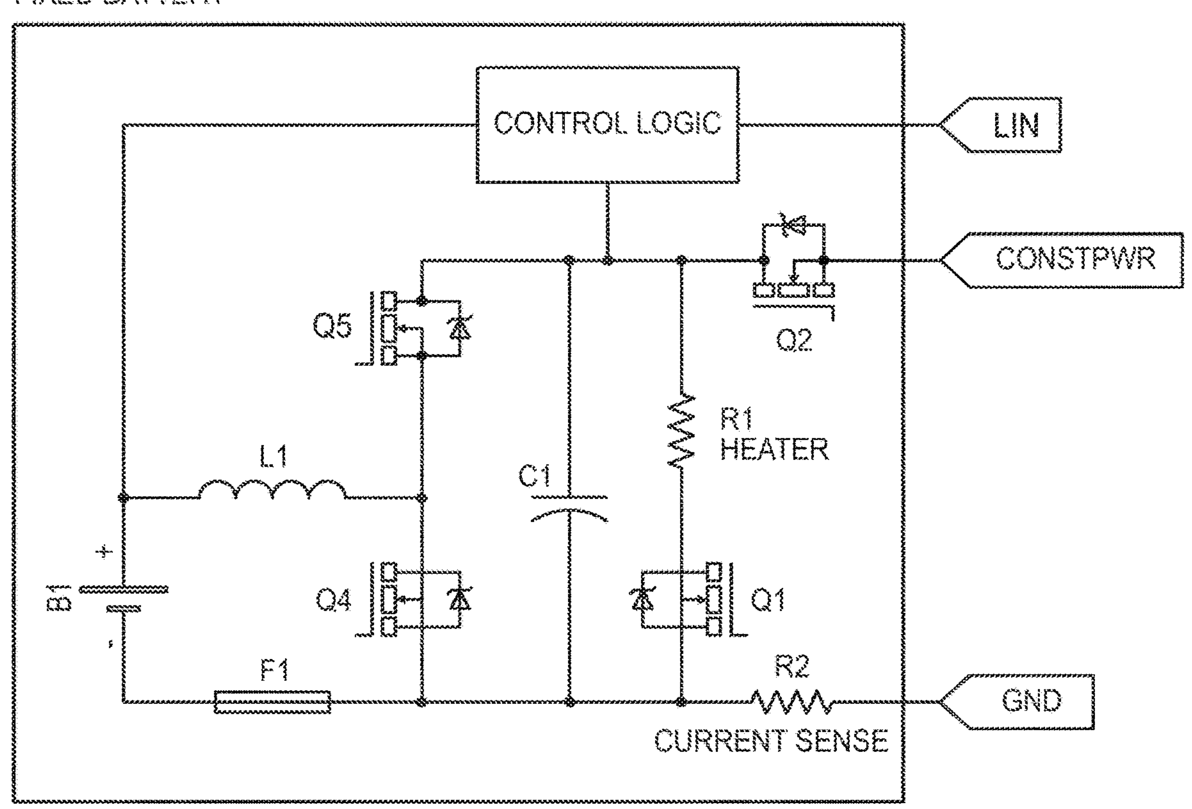

An exemplary circuitry of fixed lithium-ion battery 1232 is shown in FIG. 18. The illustrative design includes a single battery cell for simplicity, which eliminates the need for cell balancing and ensures that the cell voltage is lower than the power pin. However, it should be appreciated that, in some embodiments, the fixed lithium-ion battery 1232 may include multiple battery cells. As shown in FIG. 18, MOSFETs Q4 and Q5 and inductor L1 form a bi-directional DC-DC converter for charging and discharging of battery cell B1. Electrical heater R1 is included to raise the cell temperature as needed. The heater is powered from the power pin, such that it is not limited by the discharge current limit of a cold battery cell. Additionally, MOSFET Q2 is normally on but may be turned off to prevent over discharge of the battery cell.

Moreover, when the voltage on the constant power pin is greater than 13V and the battery is too cold for charging, the control logic turns on MOSFET Q1 to apply power to the heater. Once the temperature is in an acceptable range, it varies the duty cycle of MOSFET Q5 to provide a controlled charge current to B1. When the voltage on the constant power pin is less than 8V, the control logic varies the duty cycle of MOSFET Q4 to transfer power from B1 to the constant power pin in order to maintain 8V at the constant power pin. The output current is measured through current sensor R2 and the voltage on the constant power pin is allowed to drop to prevent the output current from exceeded a predetermined threshold. In some embodiments, the control logic may provide status information over a serial bus, including cell voltage, SOC, and temperature, output current, and fault status.

Referring back to FIG. 17, an exemplary schematic circuit diagram of removable lithium-ion battery system 1200 is shown. Removeable battery circuitry includes four electrical connections, including Start Power, Constant Power, Ground, and LIN. Removeable battery circuitry further includes multiple batter cells (B1-B #) wired in series. Start MOSFET Q9 is configured to block discharge current when off or disconnected from the vehicle. Charge MOSFET Q7 is configured to block charge current when cold, disconnected from the vehicle, or in the event of excessive charge voltage or current. Removeable battery circuitry includes a DC/DC converter circuit with two output voltage settings, nominally 7.5V and 12.8V, and current limiting. The current limit may change with the voltage output setting. The output of the DC/DC converter is connected to the constant voltage pin via a diode to prevent current flow when the voltage at the pin is greater than the output setting. Removeable battery circuitry further includes cell balancing circuitry and cell heating element(s). In one implementation, the cell heating element may be connected to each cell. Optionally in this implementation, the per cell heating elements are selectively turned on during charging to provide cell balancing. Additionally, removeable battery circuitry further includes current sensor R1, one or more temperature sensors, such as a thermistor, and control circuitry including a serial communications interface such as LIN.

In the off state, removeable battery 1230 is configured to turn off start MOSFET Q9 and use a DC/DC converter circuitry to supply approximately 7.5V to its Constant Power pin. This voltage is sustained until the pack reaches a predetermined minimum SOC. The start field-effect transistor (FET) is configured to prevent current from flowing in case of a short circuit across two pins when the battery is not installed. The charge FET is configured to prevent charging of the battery when the cell temperature is too low. The Constant power output is current-limited to prevent damage in case of a short-circuit. The Constant power output includes a blocking diode, such that no power flows through the pin when the voltage is greater than the voltage set point. Removeable battery 1230 may receive commands over the LIN serial communications bus, such as, but not limited to, heating enable/disable, start FET on/off, and/or wake/sleep commands. Additionally, removeable battery 1230 may send status over the LIN serial communications bus, such as, but not limited to, pack voltage, current, and temperature, charge and discharge current limits, and/or heater, DC/DC converter, and start and charge FET status. For example, cell heating may be turned on when heating is enabled and the battery temperature is less than optimal for charge and discharge performance. The heaters are powered by the battery cells. As described above, in one implementation, the cell heating element may be connected to each cell. Optionally in this implementation, the per cell heating elements are selectively turned on during charging to provide cell balancing.

Referring now to ISG controller circuitry of removable lithium-ion battery system 1200, MOSFET Q1 PWMs is configured to pack voltage to supply 14V power to fuel pump 1222. The inductance of fuel pump 1222 is utilized to filter the output of Q1. Diode D1 is configured to provide a path for fuel pump 1222 current to flow when Q1 is off. Diode D7 is configured to prevent current from flowing into ISG controller 1210 when an external voltage is applied to fuel pump 1222, such as when priming fuel pump 1222. MOSFET Q6 is configured to connect constant power to switched power when the key switch is closed or the power button is pressed to wake the system. Diode D6 is configured to ensure that voltage is present at ECM 1224 when Q6 is on, while blocking current flow when ECM output voltage is greater than the switched power output. MOSFET Q2 is configured to be turned on to supply battery power to the three-phase bridge during starting.

To start the engine, ISG controller 1210 is configured to use a flywheel encoder input and the three-phase bridge to apply variable frequency AC voltage to the stator synchronous to the flywheel position. When the engine is running, the three-phase bridge is configured to alternately shunt the stator phases and rectifies the stator output to feed the current steering circuitry. When the engine is running, MOSFETs Q2-Q5 and diodes D3-D5 are configured to provide current steering. At most one of MOSFET Q2-Q5 is on at any given time, directing current to the respective output. Capacitors C2-C5 are configured to filter the outputs. When none of the MOSFETS are on, current flows through the body diode of Q2 to charge C2 and supply power to Q1 and potentially the removeable battery. Diode D2 is configured to supply power to the Constant Power pin, raising this voltage above the output voltage of both the removeable and fixed batteries. ISG controller 1210 includes a CAN bus serial interface to the other electronic controllers on the vehicle and a LIN bus serial interface to the removeable and fixed batteries.

Figure 16:
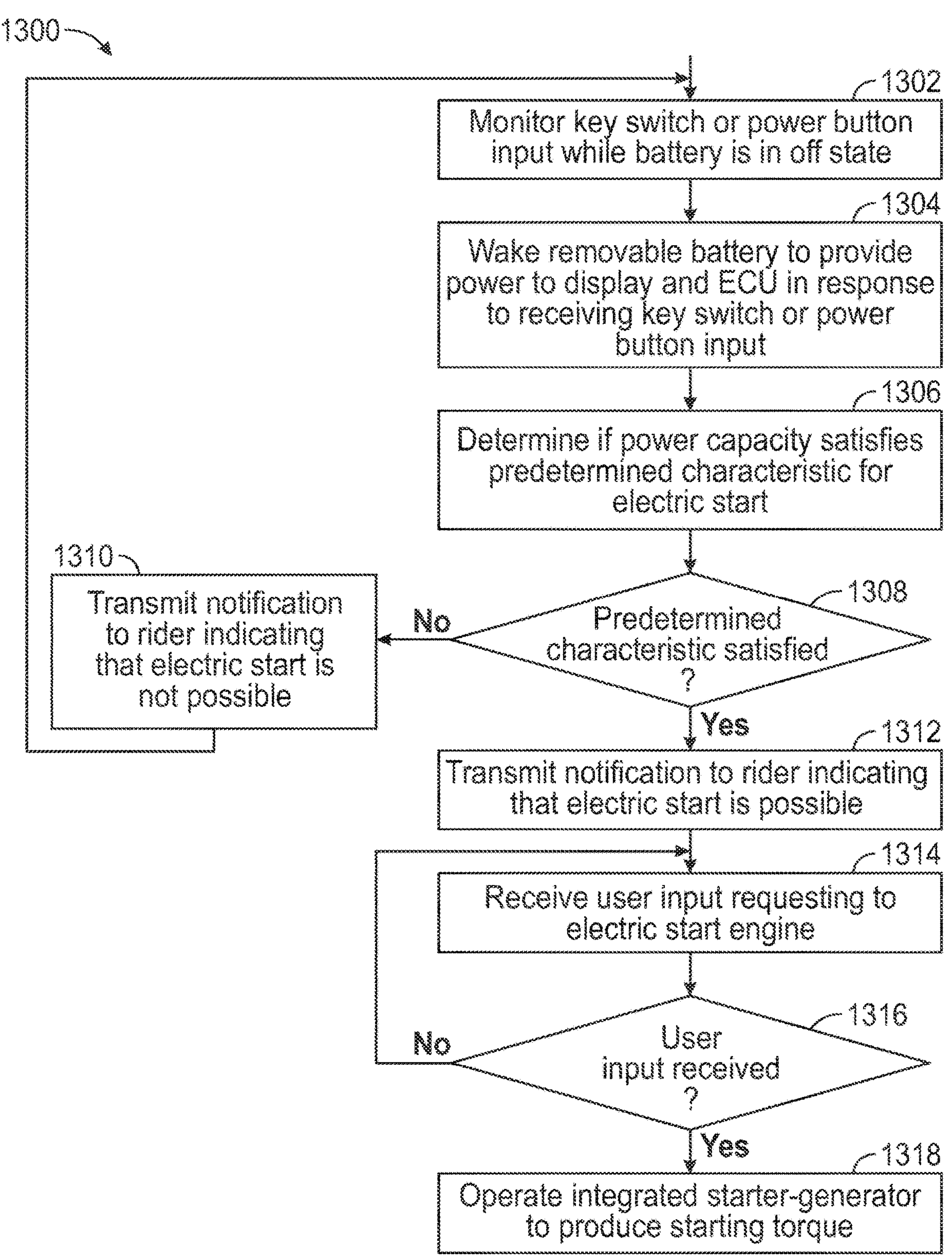
FIG. 16 is a flow diagram illustrating a computer-implemented method for electric starting an engine from a removeable battery using the removable battery of FIG. 15.

Referring now to FIG. 16, a computer-implemented method 1300 for electric starting an engine from a removeable battery is shown. In the illustrative embodiment, the vehicle supports an electric start or restart of the engine while the engine is stopped by delivering electrical power to an engine control module (ECM) when a power source satisfies a predetermined characteristic. Specifically, with the key on but the engine not running, in response to a user input, the vehicle operates an integrated starter-generator (ISG) 1223 to turn the engine and the ECM operates the fuel injectors and ignition coil to start the engine.

To do so, the method 1300 is performed by an integrated starter generator (ISG) controller (e.g., 1210) of the vehicle that is communicatively coupled to the removeable battery (e.g., 1230) to control an integrated starter-generator (ISG) (e.g., 1223) to turn the engine. In block 1302, while removeable battery 1230 is in the off state (e.g., 1102), ISG controller 1210 monitors a key switch input via a key (e.g., 1236) and/or a power button input via a power button (e.g., 1234).

In block 1304, when the key switch is closed or the power button is pressed, ISG controller 1210 wakes removeable battery 1230 with a message on a LIN bus 1238 to provide power to a display and an engine control module (ECM) (e.g., 1224). In some embodiments, it may also enable a removeable battery's heater.

When removeable battery 1230 is in the wake state (e.g., 1104), ISG controller 1210 determines if a power capacity of removeable battery 1230 satisfies a predetermined characteristic for the electric start of the engine, as indicated in block 1306. As an example, the predetermined characteristic may include the power capacity of removeable battery 1240 exceeding a predetermined threshold. For example, a control logic of removeable battery 1230 may measure the battery temperature and track its state-of-charge. Removeable battery 1230 may use these measurements to periodically or continually update a maximum discharge current. Subsequently, the maximum discharge current is transmitted to ISG controller 1210 over the LIN bus 1238. Additionally, an engine control module (ECM) 1224 may transmit an engine coolant temperature to ISG controller 1210 over CAN. In the illustrative embodiment, ISG controller 1210 may determine the predetermined threshold for the electric start of the engine based on engine coolant temperature and time since the engine was stopped. Subsequently, ISG controller 1210 may compare the maximum discharge current received from removeable battery 1230 against the predetermined threshold for the electric start.

If ISG controller 1210 determines that the power capacity does not satisfy the predetermined characteristic (e.g., below the predetermined threshold) in block 1308, method 1300 proceeds to block 1310. In block 1310, ISG controller 1210 transmits a notification to a rider of the vehicle indicating that the electric start is not possible. In some embodiments, the notification may further include a message indicating that a manual start is required to start the engine. In other embodiments, the notification may include a charging status of removeable lithium-ion battery 1230. It should be appreciated that the notification may be displayed on a gauge of the vehicle and/or a display screen that is communicatively coupled to the vehicle. Subsequently, method 1300 loops back to block 1302.

If, however, ISG controller 1210 determines that the power capacity satisfy the predetermined characteristic (e.g., above the predetermined threshold) in block 1308, method 1300 advances to block 1312. In block 1312, the ISG controller 1210 transmits a notification to a rider of the vehicle indicating that the electric start is possible. For example, the notification may be displayed on a gauge of the vehicle and/or a display screen that is communicatively coupled to the vehicle.

Subsequently, method 1300 proceeds to block 1314 to receive the rider input requesting to electric start. For example, the rider may use a pushbutton or a selection on a touchscreen display of the vehicle to request an engine start. In other words, ISG controller 1210 is configured to initiate an electric start when it has determined that sufficient power is available and the user then presses the start button.

If ISG controller 1210 determines that a user input has not been received in block 1316, method 1300 loops back to block 1314 to continue awaiting a user input. If, however, ISG controller 1210 determines that a user input has been received, method 1300 proceeds to block 1318.

In block 1318, ISG controller 1210 operates the ISG 1223 to turn the engine. To do so, an electric start begins with a ramp up of the voltage on fuel pump 1222. Once the predetermined fuel pump voltage is reached, ISG controller 1210 applies AC voltage to the stator to produce starting torque.

Subsequently, the status of removeable lithium-ion battery 1230 transitions to the run state 1110 when a predetermined time has elapsed since the user input.

Figure 19:
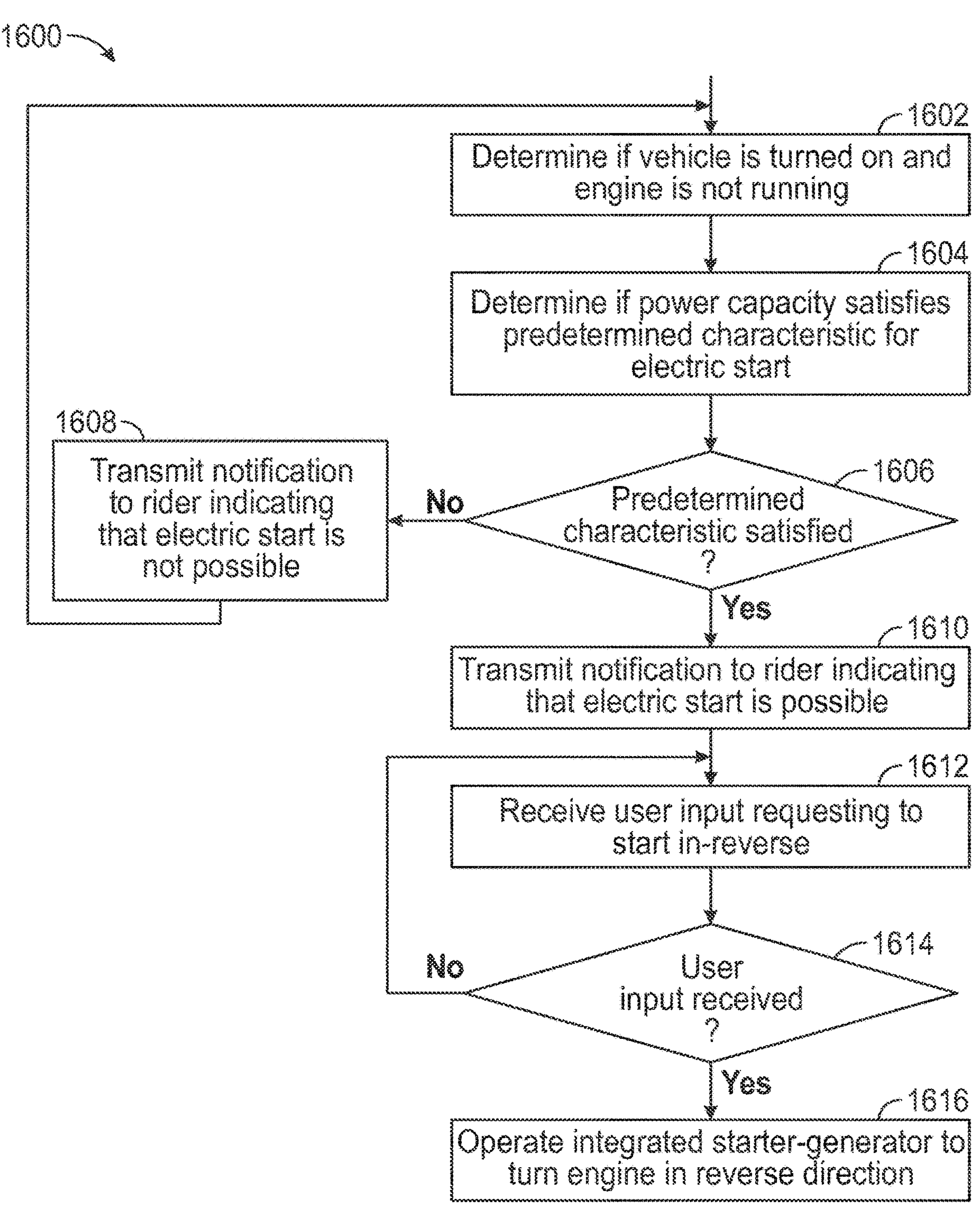
FIG. 19 is a flow diagram illustrating a computer-implemented method for starting an engine of a vehicle in reverse, according to an example of the present disclosure.

Referring now to FIG. 19, a computer-implemented method 1600 for starting an engine of a vehicle in reverse is shown. In the illustrative embodiment, the vehicle supports an electric start or restart of the engine in a reverse direction while the engine is stopped by delivering electrical power to an engine control module (ECM) when a power source satisfies a predetermined characteristic. Specifically, with the key on but the engine not running, in response to a user input, the vehicle operates an integrated starter-generator (ISG) to turn the engine in the reverse direction and the ECM operates the fuel injectors and ignition coil to start the engine in reverse. By going straight from engine stopped to reverse, time needed to operate the vehicle in reverse is reduced. This speeds up backing up the vehicle off a trailer or out of a shed and reduces wear and tear on the engine and starting system.

To do so, the method 1600 is performed by an integrated starter generator (ISG) controller of the vehicle to control an integrated starter-generator (ISG) to turn the engine in a reverse direction. In block 1602, the ISG controller determines if a vehicle is turned on but an engine of the vehicle is not running. In response to determining that the vehicle is turned on but the engine is not running, the ISG controller further determines if a power capacity of a power source satisfies a predetermined characteristic for the electric start of the engine, as indicated in block 1604. For example, the predetermined characteristic may include the power capacity of the power source exceeding a predetermined threshold. The power source may include a lithium-ion battery or ultracapacitors. For example, in some embodiments, the power source may calculate and transmit its power capacity and a maximum discharge current based on its temperature and state-of-charge to the ISG controller. The ISG controller may use the engine temperature and time stopped to determine the predetermined threshold for the electric start of the engine power capacity required to start the engine.

If the ISG controller determines that the power capacity does not satisfy the predetermined characteristic (e.g., below the predetermined threshold) in block 1606, method 1600 proceeds to block 1608. In block 1608, the ISG controller transmits a notification to a rider of the vehicle indicating that the electric start is not possible. In some embodiments, the notification may further include a message indicating that a manual start is required to start the engine. In other embodiments, the notification may include a charging status of the power source. Subsequently, method 1600 loops back to block 1602.

If, however, the ISG controller determines that the power capacity satisfies the predetermine characteristic (e.g., exceeds the predetermined threshold) in block 1606, method 1600 advances to block 1610. In block 1610, the ISG controller transmits a notification to a rider of the vehicle indicating that the electric start is possible. For example, the notification may be displayed on a gauge of the vehicle and/or a display screen that is communicatively coupled to the vehicle.

Subsequently, method 1600 proceeds to block 1612 to receive the rider input requesting to start in-reverse. For example, the rider may use a pushbutton or a selection on a touchscreen display of the vehicle to request an engine start in the reverse direction.

If the ISG controller determines that a user input has not been received in block 1614, method 1600 loops back to block 1612 to continue awaiting a user input. If, however, the ISG controller determines that a user input has been received, method 1600 proceeds to block 1616.

In block 1616, the ISG controller operates the ISG to turn the engine in the reverse direction. To do so, the ISG controller applies voltage to a stator to produce starting torque in the reverse direction.

Now referring to FIG. 20, another computer implemented method of determining which start modes are available to an operator of vehicle 10 will be discussed. A method 2000 starts with decision block 2002 and either ISG controller 1210 or ECM 1224 determines if the available current or power capacity of battery 1230 satisfies a first predetermined characteristic to conduct an electric start of vehicle 10. This step is similar to step 1306 of method 1300. In the present embodiment, the first predetermined characteristic is a first current threshold. In an example thereof, in block 2002, either of ISG controller 1210 or ECM 1224 compares the present battery current (A) to the first current threshold. In various embodiments the first predetermined characteristic may be a voltage threshold.

If it is determined in decision block 2002 that the current (A) of battery 1230 is insufficient to conduct an electric start of vehicle 10, method 2000 moves on to decision block 2018. In decision block 2018, ISG controller 1210 determines if the available current (A) of battery 1230 satisfies a second predetermined characteristic. In the present embodiment, the second predetermined characteristic is a second current threshold. That is, in block 2018, either of ISG controller 1210 or ECM 1224 compares the present current (A) to the second current threshold. In the present embodiment, the second current threshold is less than the first current threshold. If it is determined that the available current (A) of battery 1230 satisfies the second predetermined characteristic, method 2000 determines that the pull assist starting method is available to the rider in block 2020. If it is determined that the available current (A) of battery 1230 does not satisfy the second predetermined characteristic, method 2000 determines that a manual start is required by the rider in block 2022. That is, if the available current (A) is less than the second current threshold, a notification is provided to the rider that a manual start is necessary to start the engine of vehicle 10.

If it is determined in decision block 2002 that the current (A) of battery 1230 is greater than the first current threshold, that means there is sufficient current to conduct an electric start of vehicle 10 and method 2000 moves on to decision block 2004. In decision block 2004, either of ISG controller 1210 or ECM 1224 determines what the current engine rotation count is and compares that to an engine rotation count threshold. The engine rotation count is defined as the current aggregate revolutions of the crankshaft measured since the ISG controller 1210 was last in an off state. In the present embodiment, the engine rotation count threshold is zero revolutions, 100 revolutions, 1000 revolutions, or another suitable number of rotations. Decision block 2004 is configured to determine if the engine of vehicle 10 is in a 'warmed-up' state or if the engine is starting from a 'cold-state' which impacts the amount of force required to start the engine.

If it is determined in decision block 2004 that the engine rotation count is less than the engine rotation count threshold, method 2000 moves on to decision block 2010. Decision block 2010 is a determination if the ISG controller 1210 is in a powered ON, or initialized state, or a powered OFF, un-initialized state. If the ECM is in a powered ON state, this is indicative that the vehicle is keyed on, and if the ECM is in a powered OFF state, this is indicative that the vehicle is keyed off. If it is determined in decision block 2010 that controller 1210 is un-initialized, method 2000 moves on to decision block 2018, and the engine of vehicle 10 may be started in either a pull-assist mode or a manual mode, as previously described.

If it is determined in decision block 2010 that controller 1210 is in an initialized state, this indicates that the rider will likely desire to turn on the engine of vehicle 10. Subsequently, method 2000 moves on to determine an engine friction coefficient in a subprocess 2012 by conducting an engine friction coefficient test.

Figure 20:
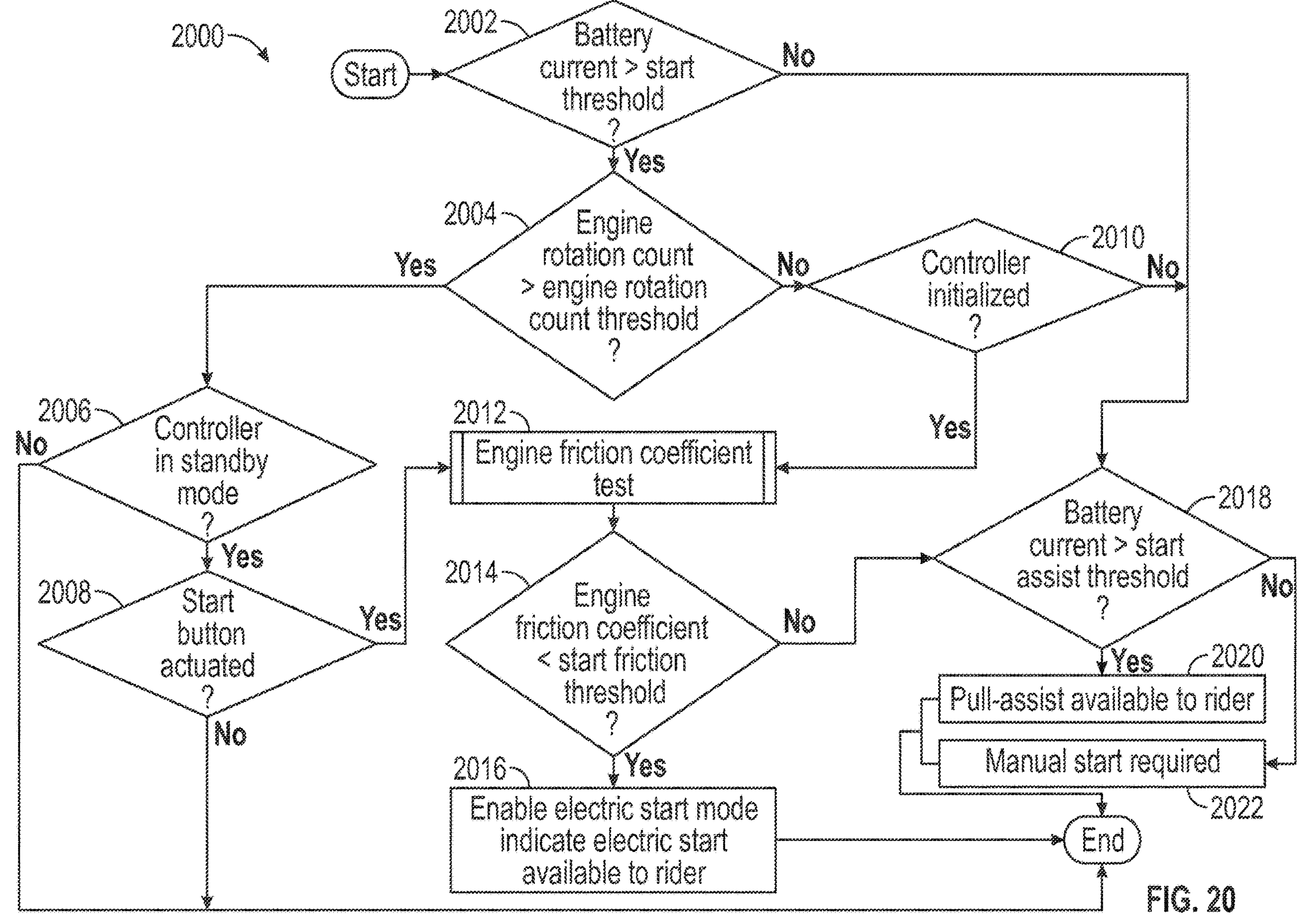
FIG. 20 is a flow diagram illustrating a computer-implemented method for determining a starting method of an engine, according to an example of the present disclosure.
Figure 20A:
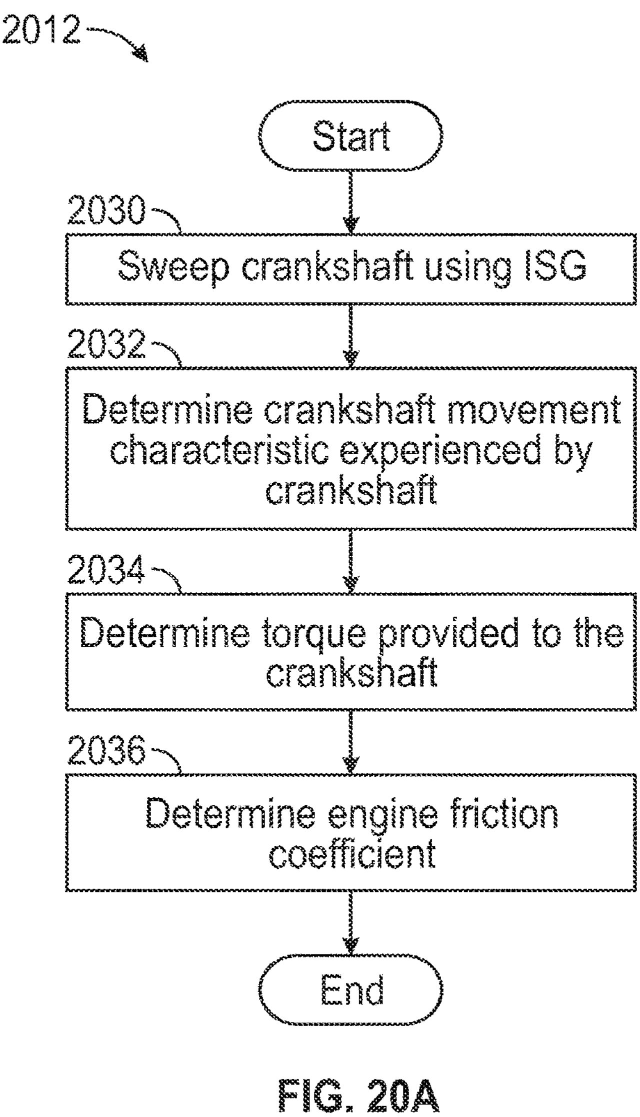
FIG. 20A is a flow diagram of a subprocess engine friction test of the flow diagram of FIG. 20, according to an example of the present disclosure.

Turning to FIG. 20A, an exemplary engine friction coefficient test in subprocess 2012 is provided. In one embodiment, in response to a start of the engine coefficient test, ISG controller 1210 is configured to provide power to stator 118 to rotate crankshaft 460 in the reverse direction until the crankshaft stops at a first position at a first predetermined crankshaft angle. That is, in step 2030 of subprocess 2012, crankshaft 460 is rotated, or swept, using the ISG 1223. In the present embodiment, the first position is a top dead center (TDC) position when the piston is in the compression stroke. When crankshaft 460 is in the first position, ISG controller 1210 provides power to stator 118 to rotate crankshaft 460 in the forward direction to a second position at a second predetermined crankshaft angle. That is, ISG 1223 sweeps the crankshaft 460 from the first position to the second position. As illustrated in block 2032, either of, or both of, ISG controller 1210 or ECM 1224 is configured to measure a representative crankshaft movement characteristic while crankshaft is moving between the first position and the second position. In the present embodiment, either of ISG controller 1210 or ECM 1224 is configured to measure a maximum RPM (RPM_max). In various embodiments, the measured crankshaft movement characteristic is an acceleration value or an average RPM (RPM_avg). As represented in block 2036, either of, or both of, ISG controller 1210 or ECM 1224 is configured to determine the amount of torque provided to the crankshaft 460 by stator 118. In the present embodiment, the amount of torque provided to the crankshaft 460 is determined by the amount of power input to the stator 118. Subsequently in subprocess 2012, ISG controller 1210 uses the determined maximum RPM of the crankshaft 460 and the determined amount of torque provided to the crankshaft 460 to determine an engine friction coefficient (efc). In an example thereof, the engine friction coefficient is defined by Equation 1:

$$efc = \text{torque} * (100/\text{RPM\_max}).$$

In the present embodiment, either of ISG controller 1210 or ECM 1224 is configured to measure a maximum RPM (RPM_max). In various embodiments, the measured crankshaft movement characteristic is an acceleration value or an average RPM (RPM_avg). As represented in block 2036, either of, or both of, ISG controller 1210 or ECM 1224 is configured to determine the amount of torque provided to the crankshaft 460 by stator 118. In the present embodiment, the amount of torque provided to the crankshaft 460 is determined by the amount of power input to the stator 118. Subsequently in subprocess 2012, ISG controller 1210 uses the determined maximum RPM of the crankshaft 460 and the determined amount of torque provided to the crankshaft 460 to determine an engine friction coefficient (efc). In an example thereof, the engine friction coefficient is defined by Equation 1:

$$efc = \text{torque} * (100/\text{RPM\_max}).$$

In another embodiment, ISG controller 1210 provides instructions and a brief pulse of power to stator 118 to rotate crankshaft 460 within the engine. In the present embodiment, crankshaft 460 is configured to rotate between compression strokes of a 2-stroke engine, or sweep, between compression strokes. In various embodiments, crankshaft 460 is configured to sweep between +90/−90 degrees from center and/or the crankshaft starting point. In various embodiments, crankshaft 460 is configured to sweep between +120/−120 degrees from center and/or the crankshaft starting point. In various embodiments, crankshaft 460 is configured to sweep between +45/−45 degrees from center and/or the crankshaft starting point. In various embodiments, the crankshaft is configured to sweep as far as it is able to under a predetermined amount of power provided to the stator over a predetermined amount of time. In one example, ISG controller 1210 provides 100 W for one second to stator and ISG controller 1210 measures the total rotation achieved by crankshaft 460. In the present embodiment, ISG controller 1210 would determine the torque provided to the crankshaft 460 based upon the power provided to the stator 118 as well as determine the measured average rotation rate (RPM_avg) of the crankshaft based upon the total rotation achieved over the time power was provided to the stator 118. In the an example thereof, the engine friction coefficient is defined by Equation 2:

$$efc = \text{torque} * (100/\text{RPM\_avg}).$$

In the present embodiment, ISG controller 1210 uses both of (1) the amount of power generated and/or provided to the stator 118; and (2) the measured movement characteristic of the crankshaft 460 to determine an engine friction coefficient. In other words, the ISG controller 1210 conducts the engine friction coefficient test on the crankshaft 460 to determine how difficult it is to rotate the crankshaft 460 and start the engine.

Referring again to FIG. 20, after the engine friction coefficient (efc) is determined in step 2012, method 2000 proceeds to decision block 2014. In decision block 2014 either of ISG controller 1210 or ECM 1224 compares the determined engine friction coefficient to a predetermined engine friction coefficient threshold, referred to in FIG. 20 as a start friction threshold. If it is determined, in decision block 2014, that the determined engine friction coefficient is less than the predetermined engine friction coefficient threshold, this indicates that the frictional forces present in the engine are low enough for the electric start mode to be an effective method to start the engine of vehicle 10. If it is determined that the engine friction coefficient is less than the predetermined engine friction coefficient threshold, method 2000 moves on to step 2016. In step 2016, method 2000 is configured to enable the electric start mode, as previously described, and provide an indication or notification to the rider that the electric start mode is available to the rider.

If it is determined in step 2012 that the determined engine friction coefficient is greater than the predetermined engine friction coefficient threshold, this indicates that the electric start may be ineffective or inefficient at starting the engine of vehicle 10. That is, if the electric start mode is used when the determined engine friction coefficient is greater than the predetermined engine friction coefficient, the engine of vehicle 10 may stall out during the startup sequence or may be unable to sufficiently rotate the crankshaft 460 to start or support the ignition cycle. If it is determined in step 2012 that the determined engine friction coefficient is greater than the predetermined engine friction coefficient threshold, method 2000 moves on to decision block 2018, where vehicle 10 can be started in either a pull-assist mode or a manual mode, as previously described.

Still referring to FIG. 20, if it is determined in decision block 2004 that the engine rotation count is greater than the engine rotation count threshold, this may be indicative that the vehicle was previously running, and method 2000 moves on to decision block 2006. In decision block 2006, it is determined if ISG controller 1210 is in a standby mode. In examples thereof, standby mode may be when the controller 1210 is turned on, or initialized, but the engine of vehicle 10 is off. If the controller is not in standby mode, this may be indicative that the controller is also powered off, or uninitialized. If it is determined in block 2006 that the controller is not in standby mode (e.g., the controller is powered off) method 2000 is completed. If it is determined in block 2006 that the controller 1210 is in standby mode, process 2000 proceeds to decision block 2008 to determine if a start button has been actuated. In various embodiments, decision block 2008 determines if a user input has been received indicating a desire to start the engine of vehicle 10. In various embodiments, the user input could be an input to a tactile button, a switch, a slider, a user interface, a display, such as on the vehicle or on a wearable accessory, or the like. If it is determined in decision block 2008 that a start button has not been actuated, method 2000 is completed. If it is determined in decision block 2008 that a start button has been actuated, this is an indication of a desire to start the engine of vehicle 10, and method 2000 proceeds to subprocess 2012 and the engine friction coefficient test will be conducted, as previously explained.

Figure 21:
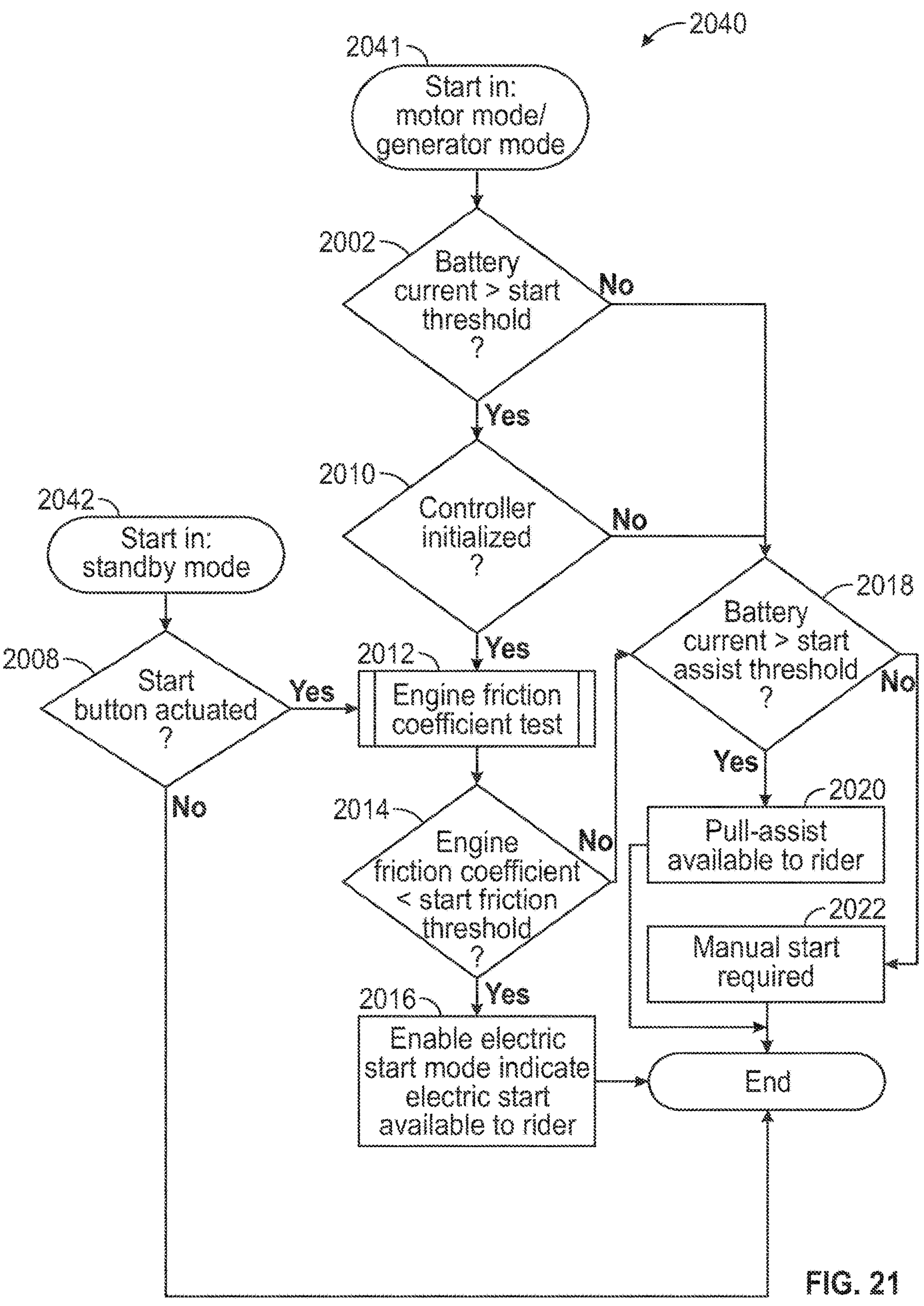
FIG. 21 is a flow diagram illustrating an alternate computer-implemented method for determining a starting method of an engine, according to an example of the present disclosure.

Referring now to FIG. 21, an alternate method 2040 of determining a start mode for the engine of vehicle 10 is provided. Method 2040 is similar to method 2000 in several ways. Method 2040 starts either at block 2041 if controller 1210 is in a motor mode or a generator mode or at block 2042 if controller 1210 is in standby mode. In the present embodiment, motor mode is indicative of a state where controller 1210 is driving current into stator 118 to turn crankshaft 460. Further, generator mode is indicative of a state where controller 1210 is pulling current from stator 118 to provide power to other electrical loads on vehicle 10.

If method 2040 starts in block 2041, the first step is decision block 2002 and either ISG controller 1210 or ECM 1224 determines if the available current or power capacity of battery 1230 satisfies a first predetermined characteristic to conduct an electric start of vehicle 10. This step is similar to step 1306 of method 1300. In the present embodiment, the first predetermined characteristic is a first current threshold. In an example thereof, in block 2002, either of ISG controller 1210 or ECM 1224 compares the present battery current (A) to the first current threshold. In various embodiments the first predetermined characteristic may be a voltage threshold.

If it is determined in decision block 2002 that the current (A) of battery 1230 is insufficient to conduct an electric start of vehicle 10, method 2040 moves on to decision block 2018. In decision block 2018, ISG controller 1210 determines if the available current (A) of battery 1230 satisfies a second predetermined characteristic. In the present embodiment, the second predetermined characteristic is a second current threshold. That is, in block 2018, either of ISG controller 1210 or ECM 1224 compares the present current (A) to the second current threshold. In the present embodiment, the second current threshold is less than the first current threshold. If it is determined that the available current (A) of battery 1230 satisfies the second predetermined characteristic, method 2040 determines that the pull assist starting method is available to the rider in block 2020. If it is determined that the available current (A) of battery 1230 does not satisfy the second predetermined characteristic, method 2040 determines that a manual start is required by the rider in block 2022. That is, if the available current (A) is less than the second current threshold, a notification is provided to the rider that a manual start is necessary to start the engine of vehicle 10.

If it is determined in decision block 2002 that the current (A) of battery 1230 is greater than the first current threshold, that means there is sufficient current to conduct an electric start of vehicle 10 and method 2000 moves on to decision block 2010. Decision block 2010 is a determination if the ISG controller 1210 is in a powered ON state, or initialized, or a powered OFF state, or un-initialized. If the ECM is in a powered ON state, this is indicative that the vehicle is keyed on, and if the ECM is in a powered OFF state, this is indicative that the vehicle is keyed off. If it is determined in decision block 2010 that controller 1210 is un-initialized, method 2040 moves on to decision block 2018, and the engine of vehicle 10 may be started in either a pull-assist mode or a manual mode, as previously described.

If it is determined in decision block 2010 that controller 1210 is in an initialized state, this indicates a desire by the rider to turn on the engine of vehicle 10 and subsequently method 2040 moves on to determine an engine friction coefficient in subprocess 2012, as previously described and shown in FIG. 20A.

Referring still to FIG. 21, after the engine friction coefficient (efc) is determined in step 2012, method 2040 proceeds to decision block 2014. In decision block 2014 either of ISG controller 1210 or ECM 1224 compares the determined engine friction coefficient to a predetermined engine friction coefficient threshold, referred to in FIG. 21 as a start friction threshold. If it is determined, in decision block 2014, that the determined engine friction coefficient is less than the predetermined engine friction coefficient threshold, this indicates that the frictional forces present in the engine are low enough for the electric start mode to be an effective method to start the engine of vehicle 10. If it is determined that the engine friction coefficient is less than the predetermined engine friction coefficient threshold, method 2040 moves on to step 2016. In step 2016, method 2040 is configured to enable the electric start mode, as previously described, and provide an indication or notification to the rider that the electric start mode is available to the rider.

If it is determined in step 2012 that the determined engine friction coefficient is greater than the predetermined engine friction coefficient threshold, this indicates that the electric start may be ineffective or inefficient at starting the engine of vehicle 10. That is, if the electric start mode is used when the determined engine friction coefficient is greater than the predetermined engine friction coefficient, the engine of vehicle 10 may stall out during the startup sequence or may be unable to sufficiently rotate the crankshaft 460 to start or support the ignition cycle. If it is determined in step 2012 that the determined engine friction coefficient is greater than the predetermined engine friction coefficient threshold, method 2040 moves on to decision block 2018, where vehicle 10 can be started in either a pull-assist mode or a manual mode, as previously described.

Still referring to FIG. 21, if controller 1210 is in standby mode, method 2040 will start in block 2042. The first step when controller 1210 is in standby mode is to monitor for an actuation of a start button, as previously described in block 2008. If no start button actuation is received, method 2040 is completed. If a start button is actuated, this is indicative of a desire by the rider to start the engine of vehicle 10, and method 2040 will proceed to complete the engine friction coefficient test in subprocess 2012.

Figure 22:
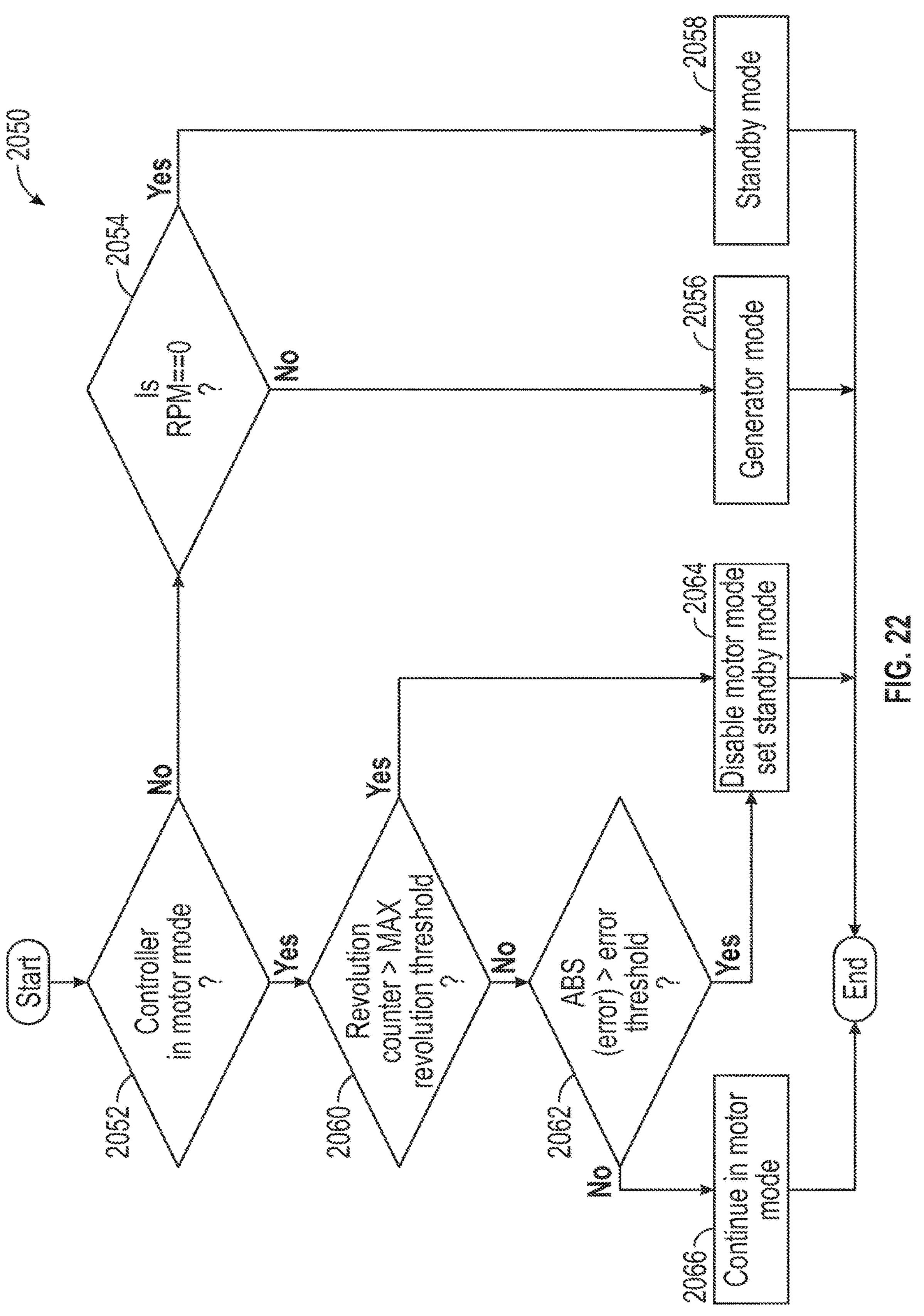
FIG. 22 is a flow diagram illustrating a computer-implemented method for determining a controller mode for an engine, according to an example of the present disclosure.

Turning now to FIG. 22, a method 2050 will be described which is configured to determine in which operating mode the engine of vehicle 10 is enabled. In the present embodiment, method 2050 starts with a determination, in block 2052, if the controller 1210, 1224 is in a motor mode. In motor mode, controller 1210, 1224 is configured to drive current into stator 118 to turn the crankshaft 460, as previously described. If it is determined, in decision block 2052, that controller 1210, 1224 is not in motor mode, but in another mode, method 2050 proceeds to block 2054. In decision block 2054, either of ECM 1224 or ISG controller 1210 measures the engine speed of the engine of vehicle 10 at the crankshaft 460 or flywheel. More specifically, decision block 2054 determines if a current engine speed of the engine is equal to zero. If it is determined that the engine speed is equal to zero, method 2050 proceeds to block 2058 and controller 1210, 1224 enters into, or remains in, standby mode and controller 1210 remains in an initiated stated but the engine is not running. If it is determined that the engine speed is not equal to zero, method 2050 proceeds to block 2056 and controller 1210, 1224 enters into, or remains in, a generator mode and controller 1210 is configured to pull power from stator 118 to provide power to other vehicle electrical loads. Block 2054 is configured to determine whether or not the engine of vehicle 10 is currently running, thereby indicating a desired use case of the engine, and stator 118, of vehicle 10.

If it is determined in decision block 2052 that the controller is in motor mode, method 2050 proceeds to decision block 2060. Decision block 2060 is determined to monitor and compare the current number of revolutions experienced by crankshaft 460 during a starting attempt to a revolutions threshold. Because motor mode is configured to enable controller 1210 to drive current into stator 118 to turn crankshaft 460, decision block 2060 will be queried during a start attempt of the engine. If it is determined in decision block 2060 that the crankshaft 460 has rotated a greater number of revolutions than the revolutions threshold, method 2050 proceeds to block 2064, and motor mode is disabled and standby mode is set. This indicates the end of an attempt to start the engine of vehicle 10. A rider may subsequently attempt to start the engine again any number of times. In the present embodiment, the revolutions threshold is four revolutions. In various embodiments, the revolutions threshold may be six revolutions, eight revolutions, or more revolutions. In various embodiments, the revolutions threshold may be based temporally, and the threshold may be one second, two seconds, three seconds, four seconds, or another time period. If it is determined in decision block 2060 that the crankshaft 460 has rotated a fewer number of revolutions than the revolutions threshold, method 2050 proceeds to block 2062.

In decision block 2062, a PID controller is utilized to create a closed loop feedback circuit to monitor the current going into the stator 118 from the ISG controller 1210. The PID controller receives a quadrature current (A) value of the battery (e.g., battery 1230) being used to drive current into the stator 118 and compares that to a reference current (A) value from the stator 118. Before attempting to start the engine, the error will be zero. As stator 118 rotates crankshaft 460 and the engine starts running, the error between the current (A) provided to the stator (118) and the reference current (A) value from the stator 118 will start to deviate because the stator will start to be rotated by the operation of the engine. During the startup of the engine, the error will continue to rise until the stator is producing enough power to overcome the voltage of the battery (e.g., battery 1230). When it is determined that the absolute value of the error between the quadrature current (A) and the reference current (A) from the stator 118 has increased to be greater than an error threshold, method 2050 proceeds to block 2064 and motor mode is disabled and controller 1210 enters standby mode. If the error between the quadrature current (A) and the reference current (A) reaches a value greater than the error threshold, this is indicative that the engine is now running and starting to create more current out of stator 118. Block 2062 is configured to protect the controller 1210 and battery (e.g., battery 1230) from an uncontrolled charge current surging backwards from stator 118 through controller 1210 and battery (e.g., battery 1230). If it is determined that the absolute value of the error between the quadrature current (A) and the reference current (A) from the stator 118 has is still less than the error threshold, method 2050 proceeds to block 2066 and controller 1210 remains in motor mode. Subsequently, method 2050 is completed and may be repeated.

Block 2062 is configured to protect the controller 1210 and battery (e.g. battery 1230) from an uncontrolled charge current surging backwards from stator 118 through controller 1210 and battery (e.g. battery 1230). If it is determined that the absolute value of the error between the quadrature current (A) and the reference current (A) from the stator 118 had is still less than the error threshold, method 2050 proceeds to block 2066 and controller 1210 remains in motor mode. Subsequently, method 2050 is completed and may be repeated.

Both comparisons completed in decision blocks 2060 and 2062 are designed to protect the engine and battery (e.g., battery 1230). That is, decision block 2060 is configured to limit the number of revolutions in a given start attempt, and decision block 2062 is configured to determine when the engine is running to prevent uncontrolled charge currents from flowing to the controller 1210 or battery (e.g., 1230).

Figure 23:
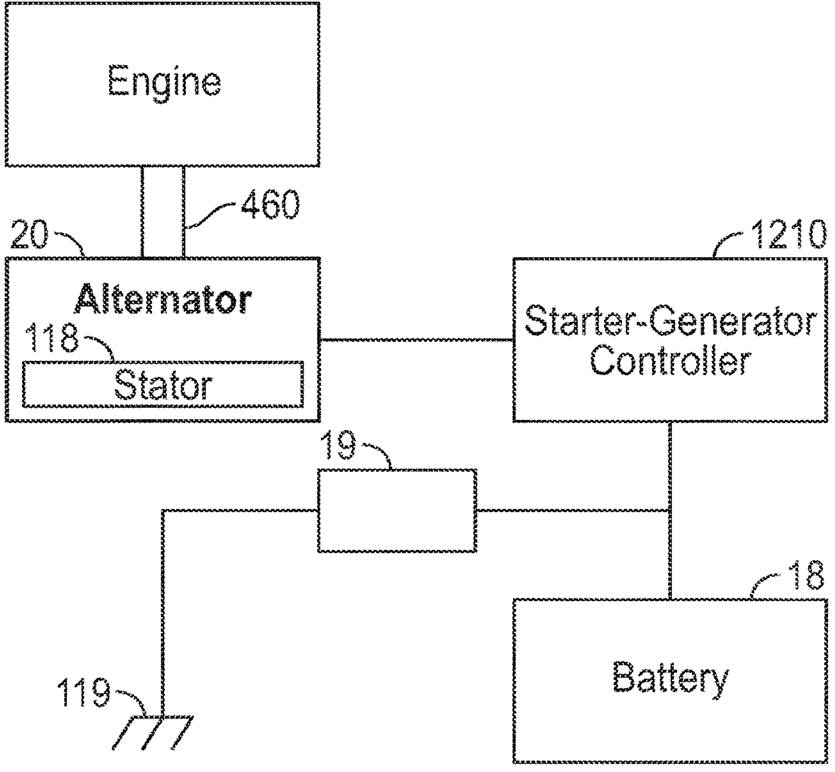
FIG. 23 is a diagram illustrating a stator and shunt diagram, according to an example of the present disclosure.
Figure 24:
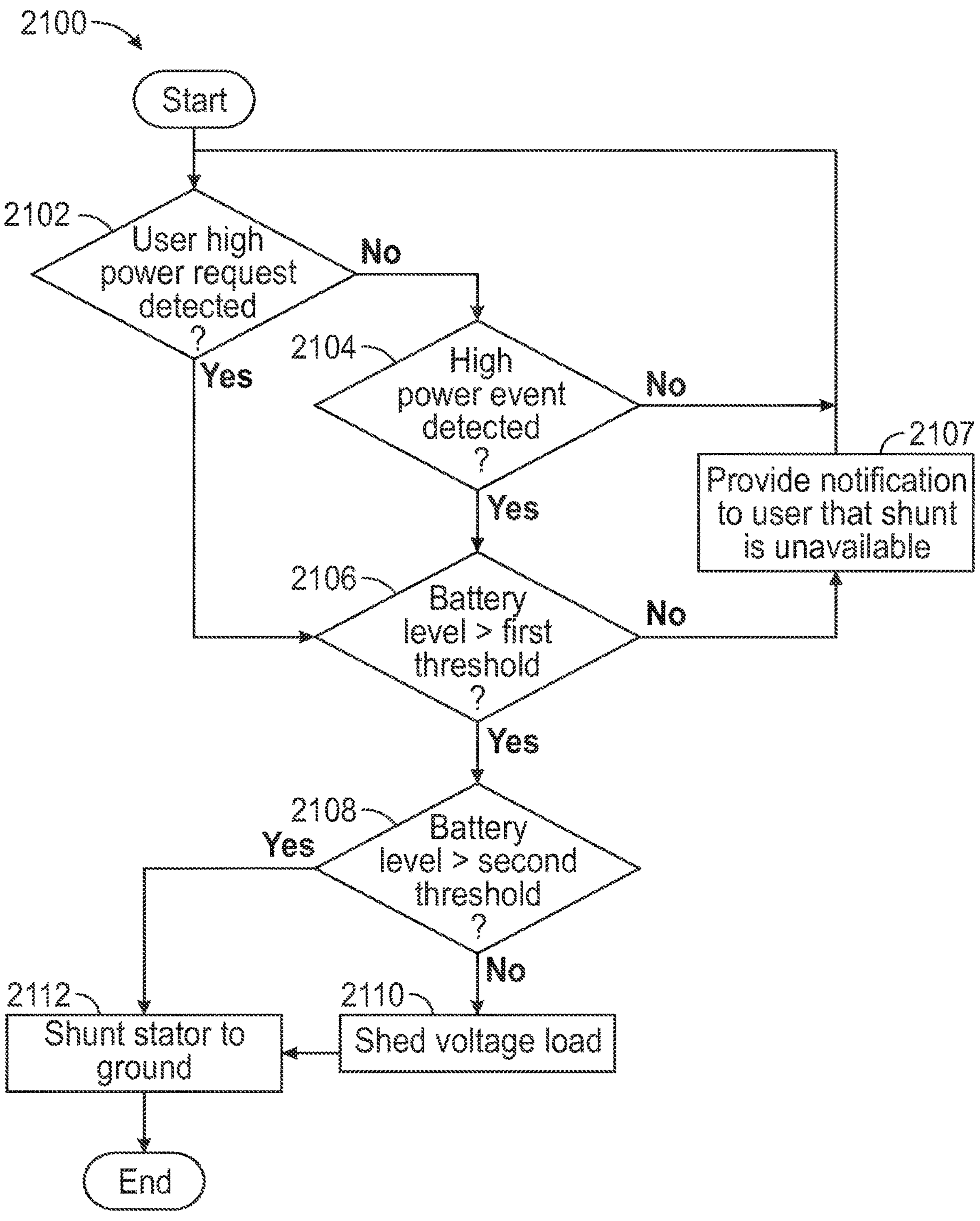
FIG. 24 is a flow diagram illustrating a computer-implemented method for determining when a stator may be shunted to a ground pin, according to an example of the present disclosure.

Now referring to FIGS. 23-24, vehicle 10 may be configured with a shunt 19 configured to shunt the stator 118 to a ground terminal, or grounded pin 119. In the present embodiment, a method 2100 is provided which determines when stator 118 may be shunted to the grounded pin 119. In method 2100, shunting stator 118 to grounded pin 119 substantially removes the resistance and/or drag that alternator 20 puts on the engine of vehicle 10, thereby increasing the total power output of the engine to the ground engaging members of vehicle 10. Method 2100 starts with a decision block 2102 where either of ISG controller 1210 or ECM 1224 determines if a user or operator of vehicle 10 has provided an input to request a higher amount of power. In the present embodiment, a request for a high power input may be a request to change drive modes, or performance modes, such as for a Sport Mode, a Track Mode. In various embodiments, as another high power input, vehicle 10 may comprise a Boost button which may trigger an acceleration event or promote acceleration by vehicle 10. In various embodiments, decision block 1210 may be configured to determine if vehicle 10 is in an ECO mode, or other mode configured to conserve fuel or otherwise operate the engine more economically. That is, by shunting stator 118 to a ground terminal, crankshaft 460 is able to move with less resistance, and provide more power to the ground engaging members and/or use less fuel during normal operation.

If it is determined in decision block 2102 that a high power request has not been requested by a user of the vehicle 10, method 2100 proceeds to decision block 2104. In decision block 2104, either of ISG controller 1210 or ECM 1224 is configured to determine if a high power event has been detected. In the present embodiment, a high power event is an acceleration event, a towing event, or another type of higher power event. A high power event may be detected by an engine speed sensor, a throttle valve position sensor, a throttle position sensor, a shock position sensor, a GPS, an IMU, an accelerometer, a gyroscope, or another type of vehicle condition sensor supported by vehicle 10.

If it is determined in decision block 2104 that a high power request is not detected, method 2100 proceeds back to the start and proceeds through decision block 2102 again. If it is determined in decision block 2104 that a high power request is detected, method 2100 proceeds to decision block 2106. Further, if it is determined in decision block 2102 that a high power request has been requested by a user of vehicle 10, method 2100 proceeds to decision block 2106. In decision block 2106, either ISG controller 1210 or ECM 1224 is configured to compare the current voltage (V) or available current (A) level of battery 18 to a first current threshold. In the present embodiment, decision block 2106 is configured to determine if the battery 18 can sufficiently provide power (based upon the current voltage (V) or available current (A) level of battery 18) to the various electrical systems of vehicle 10 without battery 18 being presently charged by alternator 20. In the present embodiment, the first threshold is 14V. In various embodiments, the first threshold is 12V, 16V, or another voltage. In various embodiments, the first threshold is a critical voltage level based upon the size of battery 18. If it is determined that the current voltage (V) or current (A) level of battery 18 is less than the first threshold, method 2100 proceeds to block 2107 and a notification or indication is provided to the user of vehicle 10 that shunting stator 18 to the grounded pin 119 is unavailable.

If it is determined in decision block 2106 that the current voltage (V) or current (A) level, of battery 18 is greater than the first threshold, method 2100 moves on to decision block 2108. In decision block 2108, either of ISG controller 1210 or ECM 1224 are configured to compare the current voltage (V) or current (A) level of battery 18 to a second threshold. In the present embodiment, the second threshold is greater than the first threshold. If it is determined that the current voltage (V) or current (A) level of battery 18 is less than the second threshold, method 2100 proceeds to block 2110 and either of controller 1210, 1224 is configured to shed other voltage loads on vehicle 10. In various embodiments controller 1210, 1224 is configured to shed voltage loads based upon criticality, voltage level, or a user selected order. In the present embodiment, voltage loads are shed until the current voltage (V) or current (A) level of battery 18 is greater than the second threshold. In various embodiments, a group of components, such as a chassis group of components (e.g., heaters, speakers, etc.) are shed together in block 2110. Additional details regarding load shedding of components may be found in U.S. application Ser. No. 16/560,588, filed Jun. 25, 2020, titled MANAGING RECREATIONAL VEHICLES AND ACCESSORIES, the entire disclosure of which is expressly incorporated herein by reference.

If it is determined, in decision block 2108, that the current voltage (V) or current (A) level of battery 18 is greater than the second threshold, method 2100 proceeds to block 2112. Additionally, if vehicle voltage loads have been shed in block 2110, method 2100 proceeds from block 2110 to block 2112. In block 2112, method 2100 completes the shunting process, and shunts stator 118 to the grounded pin 119, providing a path of least resistance between the stator 118 and the grounded pin 119 and crankshaft 460 may rotate with less resistance. In various embodiments, shunting stator 118 to the grounded pin 119 adds an additional 0.1 kW-3 kW of power to the vehicle 10. That is, shunting stator 118 to the grounded pin 119 removes 0.1 kW-3 kW of resistance-based losses from the engine. In various embodiments, shunting stator 118 to the grounded pin effectively adds more than 3 kW of additional power to the vehicle 10. In various embodiments, an indication is provided to the rider of vehicle 10 of how much additional power is being output as a result of shunting stator 118 to the grounded pin 119. The indication may be a displayed value on a user interface, a mobile device, or another visual component.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for restarting an engine of a vehicle in a reverse direction, the method comprising:

receiving, by an engine control unit, a user request to reverse engine rotation while the engine is running;

determining, by the engine control unit, that one or more parameters satisfy a predefined condition to perform reverse engine rotation;

performing, in response to determining that the one or more parameters satisfy the predefined condition and by the engine control unit, an engine reverse process by switching a starter-generator controller to a starter mode;

applying, by the starter-generator controller, braking torque to a crankshaft of the vehicle by sending excess power to a power source to decelerate a speed of the crankshaft;

developing, by the starter-generator controller, torque in an opposite direction of a current rotation of the crankshaft by using energy from the power source;

determining that the crankshaft is rotating in the opposite direction; and switching, in response to determining that the crankshaft is rotating in the opposite direction, by the engine control unit, the starter-generator controller back to a voltage regulator mode and recharge recharging the power source.

2. The method of claim 1, wherein receiving the user request to reverse engine rotation while the engine is running comprises receiving the user request via a user input of the vehicle, wherein the user input includes a pushbutton of the vehicle or a selection on a touchscreen display that is communicatively coupled to the vehicle.

3. The method of claim 1, wherein performing the engine reverse process by switching the starter-generator controller to the starter mode comprises:

disabling, by the engine control unit, spark and fuel to the engine; and transmitting, by the engine control unit, a signal to the starter-generator controller to switch the starter-generator controller to the starter mode.

4. The method of claim 1, further comprising:

determining, by the starter-generator controller, if the power source is fully charged; and shunting, in response to determining that the power source is fully charged and by the starter-generator controller, a stator to provide the braking torque to the crankshaft.

5. The method of claim 1, wherein developing the torque in the opposite direction of the current rotation of the crankshaft comprises:

determining if a speed of the crankshaft is below a predefined threshold; and developing, in response to determining that the speed of the crankshaft is below the predefined threshold, the torque in the opposite direction of the current rotation of the crankshaft by using the energy from the power source.

6. The method of claim 1, wherein switching the starter-generator controller back to the voltage regulator mode comprises enabling, by the engine control unit, the spark and fuel to restart the engine.

* * * * *